United States Patent
Hyde et al.

(10) Patent No.: US 8,466,649 B2
(45) Date of Patent: Jun. 18, 2013

(54) HEAT REMOVAL FROM MOTOR COMPONENTS

(75) Inventors: Roderick A. Hyde, Redmond, WA (US); Jordin T. Kare, Seattle, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 254 days.

(21) Appl. No.: 12/927,692

(22) Filed: Nov. 18, 2010

(65) Prior Publication Data

US 2011/0285339 A1 Nov. 24, 2011

Related U.S. Application Data

(63) Continuation-in-part of application No. 12/800,717, filed on May 19, 2010, and a continuation-in-part of application No. 12/806,149, filed on Aug. 6, 2010, and a continuation-in-part of application No. 12/806,130, filed on Aug. 6, 2010.

(51) Int. Cl.
*H02K 9/20* (2006.01)
*H02H 7/085* (2006.01)

(52) U.S. Cl.
CPC .................................. *H02H 7/0852* (2013.01)
USPC ............................ 318/473; 318/725; 318/811

(58) Field of Classification Search
CPC .................................................... H02H 7/0852
USPC ........................... 318/473, 725, 138, 439, 811
See application file for complete search history.

(56) References Cited

U.S. PATENT DOCUMENTS

| | | | |
|---|---|---|---|
| 3,439,203 A | 4/1969 | Koizumi | |
| 3,964,296 A | 6/1976 | Matzuk | |
| 4,169,990 A | 10/1979 | Lerdman | |
| 4,177,395 A | 12/1979 | Hore | |
| 4,393,344 A | 7/1983 | Whellams | |
| 4,704,906 A | 11/1987 | Churchill et al. | |
| 4,785,213 A | 11/1988 | Satake | |
| 5,217,085 A * | 6/1993 | Barrie et al. | 184/104.1 |
| 5,424,625 A | 6/1995 | Haner | |
| 5,473,906 A * | 12/1995 | Hara et al. | 62/160 |
| 5,936,374 A | 8/1999 | Haner | |
| 6,046,560 A * | 4/2000 | Lu et al. | 318/432 |
| 6,049,187 A | 4/2000 | Haner | |
| 6,222,289 B1 * | 4/2001 | Adames | 310/54 |
| 6,226,073 B1 | 5/2001 | Emoto | |
| 6,321,032 B1 | 11/2001 | Jones et al. | |
| 6,437,770 B1 | 8/2002 | Venema et al. | |
| 6,504,275 B2 | 1/2003 | Nondahl et al. | |
| 6,755,554 B2 | 6/2004 | Ohmae et al. | |
| 6,935,119 B2 * | 8/2005 | Placko et al. | 60/775 |

(Continued)

OTHER PUBLICATIONS

PCT International Search Report; International App. No. PCT/US 11/00901; Nov. 2, 2011; pp. 1-2.

*Primary Examiner* — Eduardo Colon Santana
*Assistant Examiner* — David Luo

(57) ABSTRACT

An electrical machine having a rotor component configured to rotate with respect to a stator component includes a sensing arrangement to sense electrical, magnetic, and/or mechanical machine parameters during machine operation. The electrical machine also includes a fluid sprayer coupled to a cooling controller. The cooling controller activates the fluid sprayer to spray cooling fluid on a portion of the electrical machine in response to in response to the sensed electrical, magnetic, and/or mechanical machine parameters.

48 Claims, 18 Drawing Sheets

U.S. PATENT DOCUMENTS

| | | |
|---|---|---|
| 7,053,586 B2 | 5/2006 | Jones |
| 7,166,984 B1 | 1/2007 | Jones et al. |
| 7,375,488 B2 | 5/2008 | Jones |
| 2001/0028200 A1 | 10/2001 | Hwang et al. |
| 2004/0007926 A1 | 1/2004 | Tsukada |
| 2006/0113851 A1 | 6/2006 | Ishihara et al. |
| 2007/0095075 A1 | 5/2007 | Frank |
| 2008/0001486 A1 | 1/2008 | Smith |
| 2008/0238223 A1 | 10/2008 | Tilton et al. |
| 2008/0252155 A1 | 10/2008 | Waddell et al. |
| 2009/0195091 A1 | 8/2009 | Nakahara et al. |
| 2010/0006439 A1 | 1/2010 | Ham et al. |

* cited by examiner

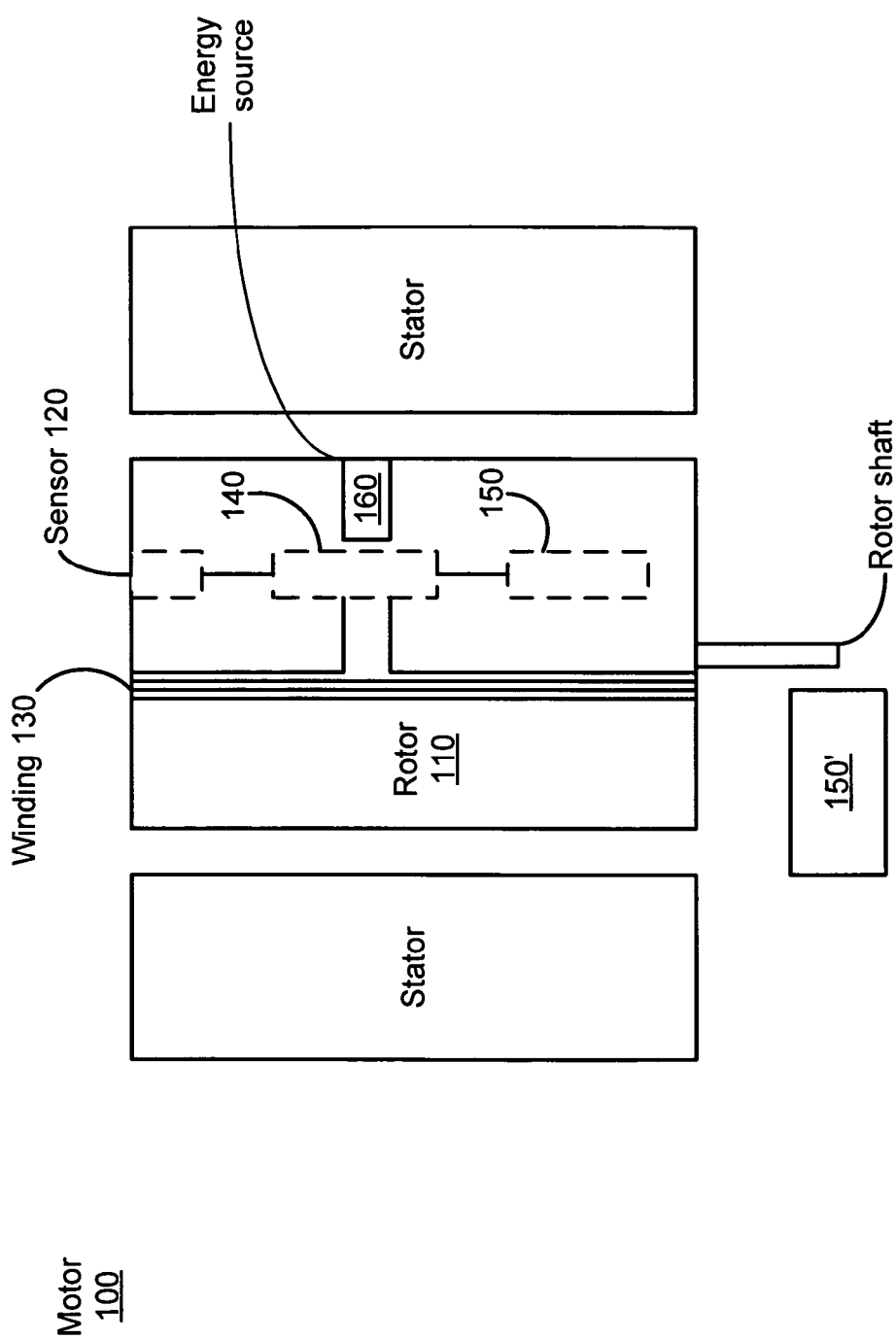

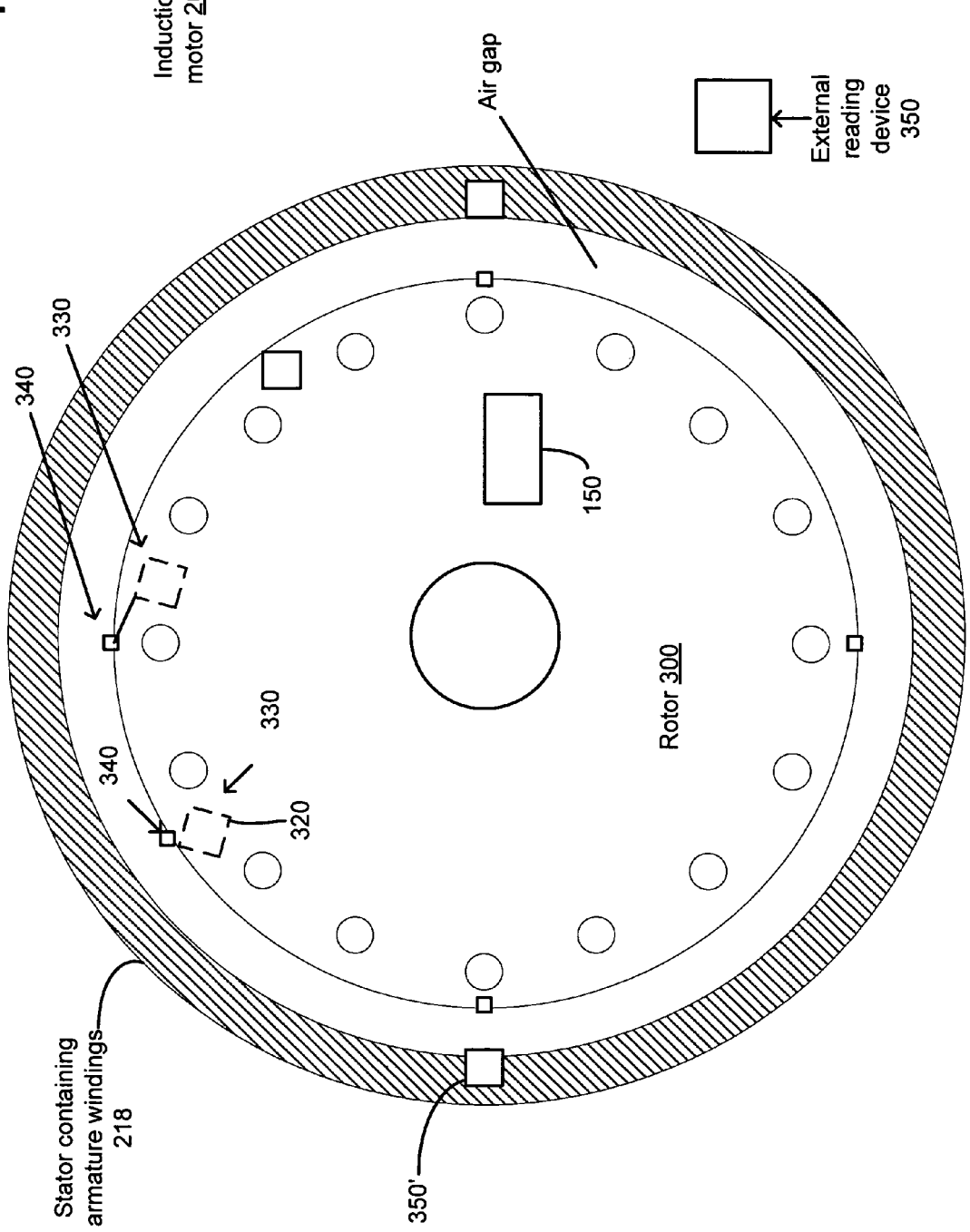

FIG. 4

410
During operation of an electrical motor having a rotor with at least one current-carrying winding, sense a motor property using at least one rotor-mounted sensor

420
Dynamically modify a property of the current-carrying winding during motor operation in response to the sensed motor property Method 400

In an induction motor having a squirrel cage rotor with longitudinal conductive bars, sense a motor characteristic during motor operation

520

Switch individual longitudinal conductive bars in the rotor during motor operation to control or regulate an operational motor parameter Method 500

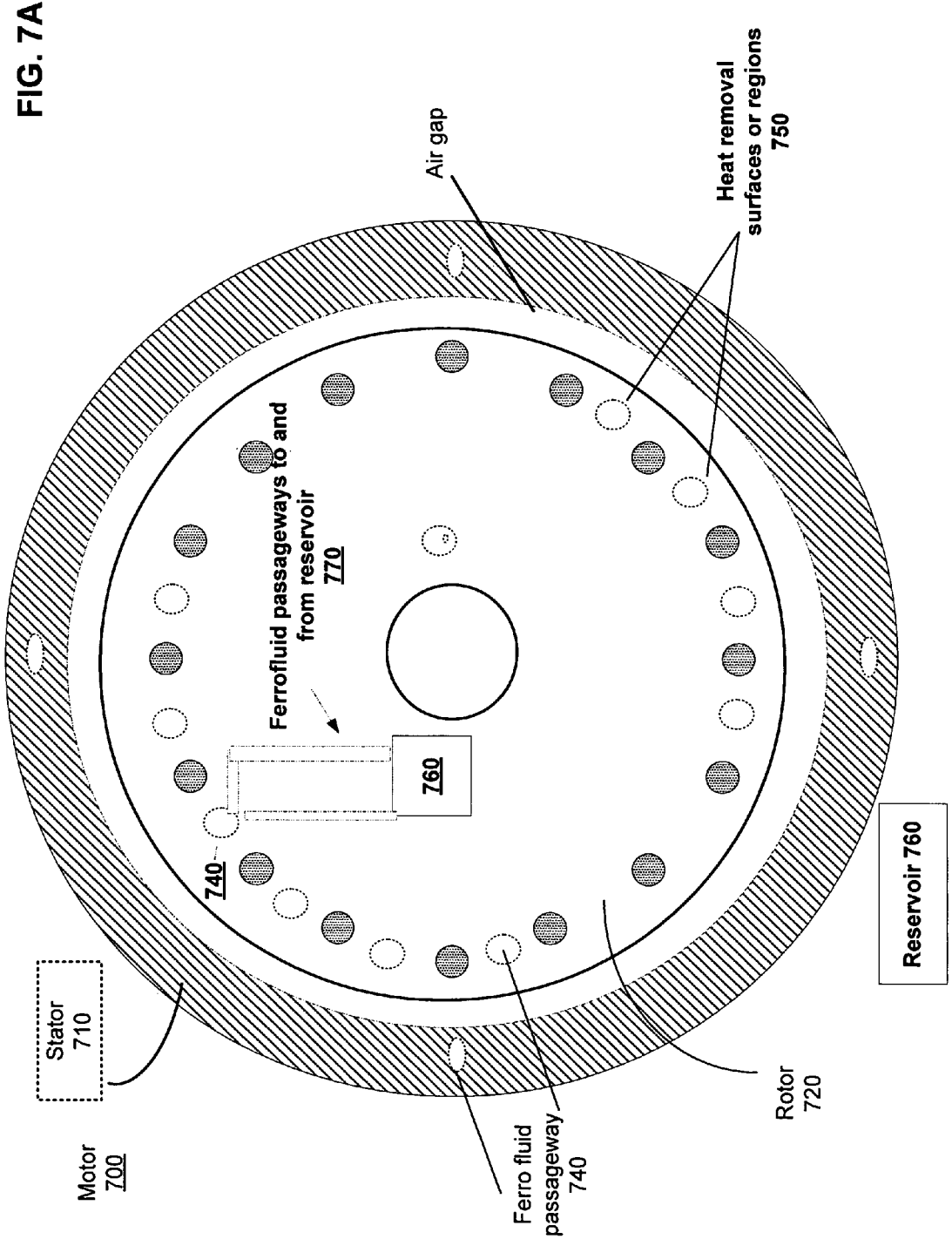

FIG. 7B

70a
Flowing a ferrofluid to one or more heat transfer surfaces in the rotor and/or stator portions.

70b
Flowing the heated ferrofluid away from the one or more heat transfer surfaces to convectively carry the heat to a cooler heat sink or location.

Method 70

FIG. 8B

Method 80

81

Providing a rotor body disposed on a rotor shaft, wherein the rotor body is configured to rotate with respect to a stator, and wherein the rotor body has an inner region proximate to the rotor shaft and an outer region proximate to the stator.

82

Using a heat pipe structure having a liquid evaporation zone, a vapor (evaporated liquid) transport passage, and a condensation zone to transfer heat, in a rotor body disposed on a rotor shaft; and Wherein the liquid evaporation zone is disposed in the rotor body in or proximate to the outer region of the rotor proximate to the stator, wherein the condensation zone is disposed outside the rotor body, and wherein the vapor (evaporated liquid) transport passage extends substantially radially from the liquid evaporation zone through the inner region toward the shaft and further extends through the shaft to the condensation zone outside the rotor body.

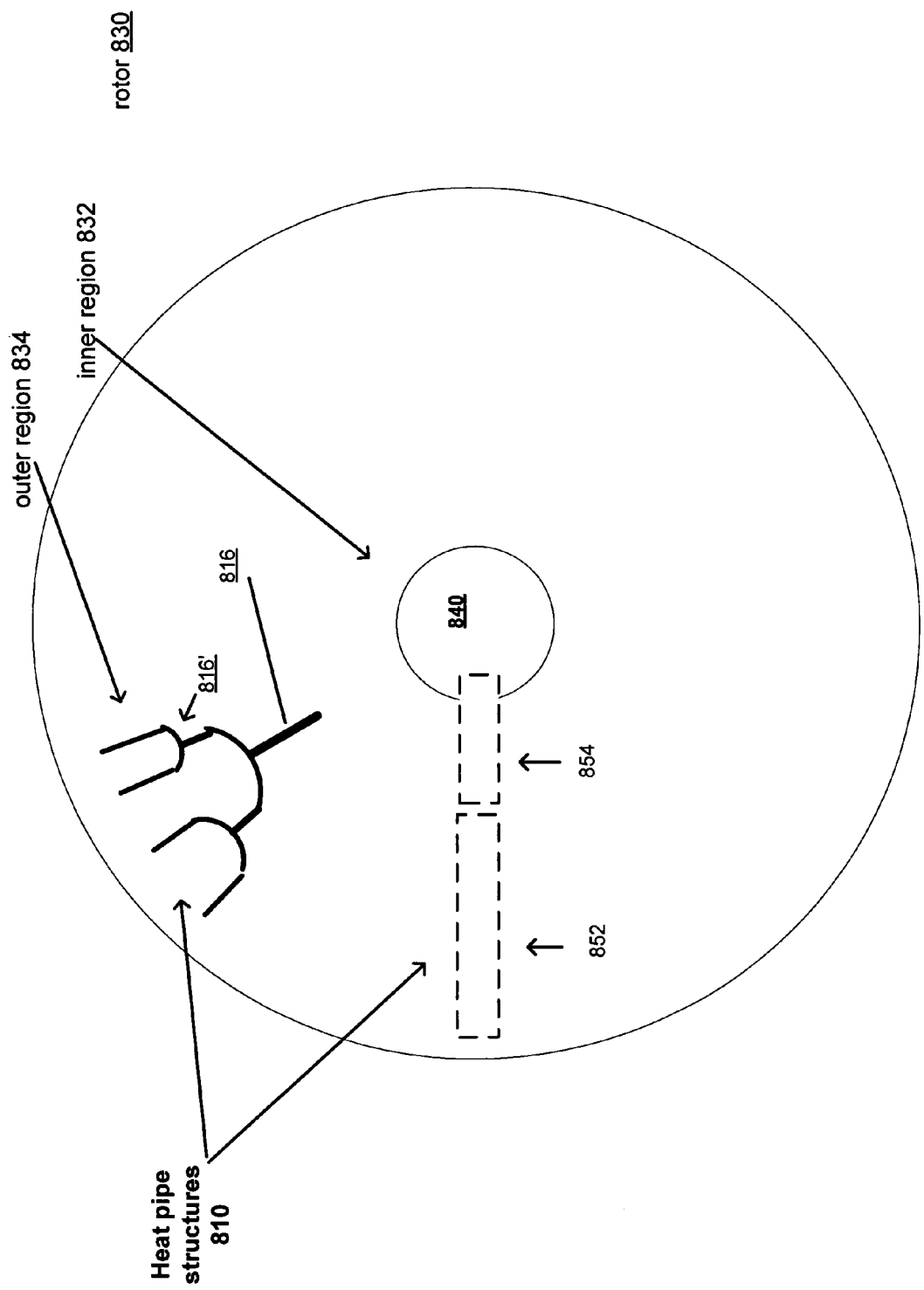

FIG. 9B

Method 90

91

In a rotor having a rotor body configured to rotate with respect to a stator about a longitudinal shaft, may include deploying at least one substantially longitudinal channel configured to flow a cooling fluid therethrough to carry heat out of the rotor body.

92 deploying at least one substantially transverse heat pipe having a first end disposed in a portion of the rotor body proximate to the stator and a second end separated from the at least one substantially longitudinal channel by a heat conductive wall wherein the at least one substantially transverse heat pipe may be configured to transfer heat from the portion of the rotor body proximate to the stator across the heat conductive wall to the cooling fluid in the at least one substantially longitudinal channel to remove heat out of the rotor body.

FIG. 10B

11
Sensing transient temperature increase at one or more machine locations during machine operation.

12
Activating the fluid sprayer to spray cooling fluid on a portion of the machine in response to the sensed transient temperature increases.

13
Deploying a second cooling arrangement configured to cool machine components independent of the sensed transient temperature increases.

Method 10

FIG. 11B

Method 20

21
Deploying an auxiliary cooling system configured to cool one or more portions of the electrical machine

22
Activating the auxiliary cooling system to cool a portion of the machine in preparation of component overheating under a machine operation scenario

23
Deploying a cooling controller is configured to time the activation of the auxiliary cooling system to cool a portion of the machine according to details of the machine operation scenario

HEAT REMOVAL FROM MOTOR COMPONENTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/800,717, entitled MOTOR WITH ROTOR-MOUNTED CONTROL CIRCUITRY, naming RODERICK A. HYDE, JORDIN T. KARE, LOWELL L. WOOD, JR. as inventors; filed 19 May 2010, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/806,149, entitled MOTOR WITH ROTOR-MOUNTED CONTROL CIRCUITRY, naming RODERICK A. HYDE, JORDIN T. KARE, LOWELL L. WOOD, JR. as inventors, filed 6 Aug. 2010, which is currently co-pending or is an application of which a currently co-pending application is entitled to the benefit of the filing date.

For purposes of the USPTO extra-statutory requirements, the present application constitutes a continuation-in-part of U.S. patent application Ser. No. 12/806,130, entitled MOTOR WITH ROTOR-MOUNTED CONTROL CIRCUITRY, naming RODERICK A. HYDE, JORDIN T. KARE, LOWELL L. WOOD, JR. as inventors, filed 6 Aug. 2010, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

BACKGROUND

This disclosure relates to electromechanical machines (e.g., electrical motors and/or electrical generators or alternators). The electromechanical machines include a stationary component (e.g., a stator assembly) and a non-stationary component (e.g., a rotor assembly), which moves relative to the stationary component. In rotating electromechanical machines, the rotor assembly is usually mounted on a rotor shaft and arranged to rotate with a predetermined air gap relative to the stator assembly. The stator assembly and rotor assembly may include permanent magnetic and/or electromagnetic elements or circuits (e.g., induction loops, wire windings, etc.), which create and/or interact with magnetic fields in the operation of the electromechanical machines.

Consideration is now being given to improving the performance characteristics of electromechanical machines.

SUMMARY

Approaches to improving the performance characteristics of electromechanical machines including motors and generators are provided.

In an exemplary approach, a rotating electrical machine has a "smart" rotor, containing "active" electronic control or regulatory elements. The active electronic elements (e.g., transistors) may be distinguished from passive electronic elements (e.g., resistors, capacitors, and inductors). In contrast to passive electronic elements, some of the active electronic elements may amplify the power of a signal under suitable conditions.

The active electronic elements may be mounted on or included within the rotor assembly. The smart rotor may not have any external wired connections (e.g., via slip rings) to the active electronic elements. The rotor-mounted active electronic elements may, for example, include one or more of switchgear, sensors, control circuitry and memory, telemetry devices, reactive elements, and/or energy-storage devices. The smart rotors may store or draw energy in other than electrical/magnetic or kinetic forms (e.g., in electrochemical form) from the internal energy-storage devices.

The rotor-mounted active electronic elements may act during machine operation to, for example, modify rotor-stator interactions. The rotor-mounted active electronic elements may be switchably coupled to at least one motor winding or circuit to controllably increase or decrease the rotor's angular rate or alter its position or orientation, for example, by increasing or reducing current flow through a rotor winding. The use of these rotor-mounted active electronic elements in a smart rotor may improve transient performance capabilities (e.g., enable mechanical surges without power-line surges, and controlled mechanical power-up or power-down capabilities in event of abrupt power-line voltage changes).

The rotor-mounted active electronic elements may enable attainment and maintenance of fractional rotational speed without significant loss-of-rated-torque, including cooperating with a stator each of whose windings are excited (e.g., with use of solid-state devices such as diodes and SCRs) with multiple half-waves of utility-derived current of the same polarity before switching to similar excitation of the opposite polarity. The rotor-mounted active electronic elements may further enable suppression of back EMF surges and voltage spikes in stator windings (and thus utility lines) via real-time measurement and active management of current flows in rotor windings or current loops.

Other aspects of the subject matter described herein relate to managing component heating or overheating during electrical machine operation. A cooling mechanism may use a ferromagnetic fluid (i.e. microscopic magnetic particles suspended in a liquid) to cool a rotor and/or stator portions of an electrical machine (e.g., a motor, generator, synchronous condenser, etc.). A moving magnetic field in a rotating machine may be used to pump ferromagnetic fluid for cooling of a machine component.

Additionally or alternatively, a cooling system/mechanism may use a heat pipe to cool a rotor and/or stator portions of the electrical machine. In an exemplary heat pipe arrangement, a heat pipe is disposed in the machine body, with evaporation surface may be in outer portions of the rotor (not just the shaft). Vapor in the heat pipe may transport heat inward through the rotor body via an open (i.e., not liquid filled) channel or volume. The vapor may then travel along a hollow shaft to a condensation surface outside the machine (e.g., outside the rotor). Centrifugal forces may aid return condensate from the condensation surface to the evaporation surface in the rotor. The heat pipe may alternatively or additionally utilize capillary/wicking action to aid return of condensate from the condensation surface to the evaporation surface. In exemplary heat pipe implementations the wicking/capillary structures may be designed so that liquid can be retained near heated region (e.g., outer rotor region) by surface tension in capillary/wick during zero/low rotation. In an exemplary cooling system/mechanism, dendritic heat pipes may be deployed for the radial heat transport. The dendritic heat pipe structures may have multiple small evaporator rivulets near rim feeding ever larger gas transport trunks. Separate "outer" heat pipes may be used near the rim transferring heat through walls to other "inner" heat pipes to carry heat radially inward. Use heat pipe to cool rotor in a motor/generator/synchronous-condenser. Evaporation surface is in outer portions of the rotor (not just the shaft), vapor transports heat inward via open (not liquid filled) channel/volume, and transfers it across a wall to axially moving gas, which transfers heat out of rotor.

An exemplary cooling system/mechanism includes a heat pipe disposed in a rotor body for radial transport of heat from an outer region to an inner region of the rotor body. The heat pipe may have a capillary/wicking action and/or centrifugal force in liquid return. The heat pipe working fluid/liquid may be retained near a heated region (outer rotor) by surface tension in capillary/wick during zero/low rotation. The heat pipe may have a dendritic structure for the radial transport. The heat pipe may have multiple small evaporator rivulets near rim feeding ever larger gas transport trunks. The heat pipe may be thermally coupled to another heat pipe to carry heat radially inward.

Another exemplary cooling system/mechanism may additionally or alternatively include one or more fluid flow channels for conductive heat transfer. The fluid (e.g., a gas) transport through the fluid flow channel may be "captive" (e.g., via the rotor shaft) or may be "free" (e.g., via openings in the rotor and/or stator). The fluid flowing through the fluid channel may be a gas (air, He, nitrogen, Freon, etc.).

Additionally or alternatively, the electrical machine cooling systems/mechanisms may utilize evaporative spray cooling of reservoir-stored fluid for auxiliary on-demand cooling of rotor/stator portions or conductors during transient heating events. The auxiliary or on-demand cooling may act at the same time as a primary cooling, or can act at times when primary cooling is not active or sufficient (e.g., during failures, during startup of main cooling, etc.). The auxiliary or on-demand cooling can act at same locations as a primary cooling mechanism, or can act at different locations (e.g., at sites where, during transient heating, conductive cooling from primary system is not adequate). For the auxiliary on-demand cooling, the evaporant may be sprayed within rotor or stator, in the rotor/stator gap, on exterior of stator, etc. The evaporant may be re-captured and recondensed for heat or mass recovery; recooling can occur gradually. Alternatively or partially, the evaporant may be exhausted with minimal/zero heat or mass recovery. The amount of evaporant sprayed may be monitored and reported. The amount of evaporant/spray coolant available may be used to determine allowable transient electrical machine operations. The determination of allowable transient operations may be carried out before start (e.g., can operate at X load for Y seconds), or during machine operation (e.g., need to reduce load to X after Y more seconds). The evaporative spray cooling may be initiated prior to planned transient operative event (e.g., prior to start-up, prior to overload, etc.). A transient heating event may, for example, be caused by increased machine load, or warm-up limitations of the machine structure (e.g., it takes heat Y seconds to diffuse into range of primary coolant pipes). Accordingly, evaporative spray cooling may be conducted so spray cool an appropriate machine surface during this time.

A cooling system/mechanism for an electrical machine may include an auxiliary cooling system to supplement cooling provided by a primary cooling system. The auxiliary cooling may involve a change (increase or locational shift) in the operation of a primary cooling system, or can involve a separate cooling system. The auxiliary cooling may act at same portions of the electrical machine as the primary cooling system, or may act at different locations (e.g., at sites where, during load increase, conductive cooling from primary system is not adequate). The auxiliary cooling system may, for example, be activated to precool portions of the electrical machine before an anticipated load increase. The anticipated load increase may be transient or lasting. A time delay between initiation of the precooling and the commencement of the load increase may be based on knowledge of the amount of load increase and the duration if the load increase is transient. The time delay can be a preset time. The initiation of the load increase on the electrical machine may be controlled based, for example, on temperature measurements, the amount and duration of precooling, etc.

The auxiliary cooling system may provide cooling based on any suitable heat transfer mechanism (e.g., liquid/gas/aerosol convection, by phase change, by thermoelectric, by spray cooling, by conduction, etc.). The auxiliary cooling system may be responsive to non-thermal characteristics (e.g., non-thermal detection of load/work changes, etc.) or to thermal characteristics (e.g., temperature change in portions of the electrical machine). The thermal characteristics may lag the non-thermal characteristics in time (e.g., an electrical machine getting hotter or colder may lag the machine is working harder or softer). The detection of the load/work changes may be based on mechanical measurements of output torque, on electrical measurements of current/voltage/fields in the motor, etc.

BRIEF DESCRIPTION OF THE FIGURES

In the accompanying drawings:

FIG. 1 is a schematic diagram illustrating features of an exemplary motor having a smart rotor containing rotor-mounted active electronic elements, in accordance with the principles of the solutions described herein;

FIG. 3 is a schematic diagram illustrating an exemplary rotor assembly with one or more one or more on-rotor sensors each of which have a sensing portion coupled to an optical readout portion, in accordance with the principles of the solutions described herein;

FIGS. 4-6 are flow diagrams illustrating exemplary features of methods that relate to use of smart rotors, in accordance with the principles of the solutions described herein;

FIGS. 7A, 8A, 8C, 9A, 10A and 11A are schematic diagrams illustrating components of exemplary electrical machine cooling systems/mechanisms, in accordance with the principles of the solutions described herein; and, FIGS. 7B, 8B, 9B, 10B and 11B are flow diagrams illustrating exemplary features of methods for cooling electrical machine components, in accordance with the principles of the solutions described herein;

Throughout the figures, unless otherwise stated, the same reference numerals and characters are used to denote like features, elements, components, or portions of the illustrated embodiments.

DESCRIPTION

Figure 2A:
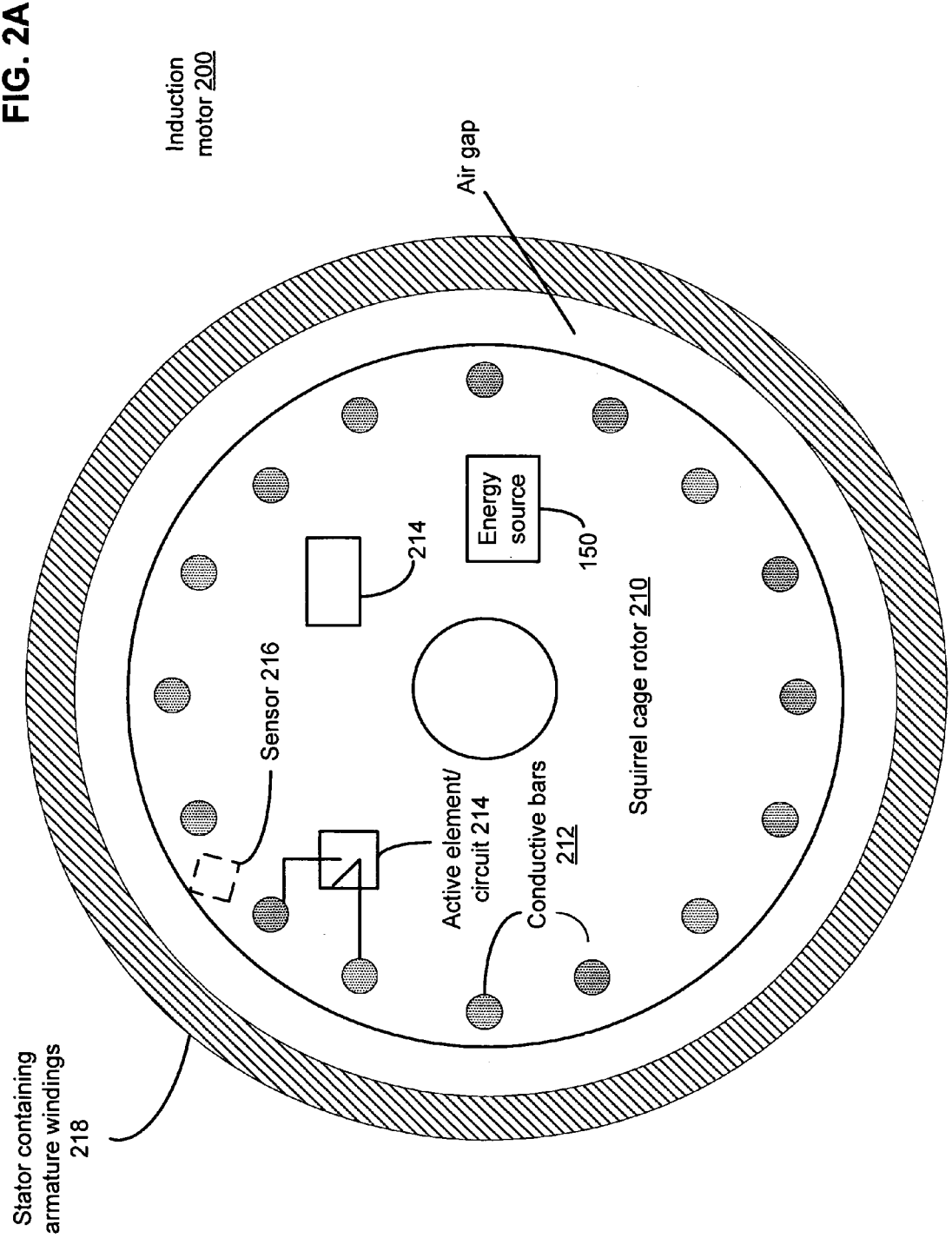
FIGS. 2A and 2B are schematic diagrams illustrating components of an exemplary induction motor having a smart squirrel cage rotor, in accordance with the principles of the solutions described herein.

In the following description of exemplary embodiments, reference is made to the accompanying drawings, which form a part hereof. It will be understood that embodiments described herein are exemplary, but are not meant to be limiting. Further, it will be appreciated that the solutions described herein can be practiced or implemented by other than the described embodiments. Modified embodiments or alternate embodiments may be utilized, in the spirit and scope of the solutions described herein.

In one approach, a mechanically or electrically-rotating machine (e.g., a motor, a generator, an alternator, a synchronous condenser) includes one or more "active" elements in a rotating element (e.g., a rotor) that can modify the electromagnetic and/or mechanical characteristics of the rotor and thereby the operational behavior of the machine. The rotor may have no wired-or-electrically-conducting connection to other parts of the motor. The active element may, for example, include a nonlinear power device. The active element may behave other than a distributed inductor, a distributed capacitor, a distributed resistor, or a distributed inertial element. The active element may behave, for example, as a source of EMF, as a non-linear reactive or resistive element, as an energy-storage or energy-release element, a magnetic reluctance-varying element, or as a control of any such element or set of them. An active inertial element may include a mechanically movable rotor element (e.g., a sliding shaft-mounted element), an inertial moment changer, etc. A controller may be configured to provide feedback between rotor and stator windings.

The terms "rotor circuitry" or "rotor-mounted circuitry" may be used herein interchangeably with terms such as rotor windings, and/or current-carrying windings or circuits. In general, the terms rotor or rotor-mounted "circuitry" will be understood to refer to one or more of the active elements (e.g., a nonlinear power device, a source of EMF, a non-linear reactive or resistive element, an energy-storage or energy-release element, a magnetic reluctance-varying element, etc.), conductors (e.g., windings, conducting loops, wires or segments), and/or any combination thereof FIG. 1 shows an exemplary electrical machine (e.g., motor 100) having a smart rotor 110 containing rotor-mounted or -embedded active elements. Exemplary electrical motor 100 includes a rotor 110 having at least one current-carrying winding 130, rotor-mounted circuitry 140 responsive to at least one rotor-mounted [or rotor-embedded] sensor 120, and an optional controller 150/150'.

Rotor-mounted sensor 120 may be configured to sense a motor property (e.g., a voltage, current, temperature, rotational speed/acceleration, and or/magnetic field, etc.) during motor operation. The rotor-mounted sensor may, for example, be configured to sense at least one of a winding current, voltage, resistance, capacitance, inductance, magnetic field and/or direction, temperature, speed, rotation rate, rotation angle and/or angular acceleration.

Rotor-mounted sensor 120 may be a sensor of the type described, for example, in U.S. Pat. No. 4,704,906 or U.S. Pat. No. 6,504,275. The first cited patent describes a rotor-mounted sensor for measuring a stator-rotor air gap. The second cited patent describes rotor-mounted sensors for sensing current, torque, velocity, temperature, and/or air gap in a motor.

The rotor-mounted circuitry may include one or more active or passive electronic devices (e.g. resistance, inductance, capacitance, voltage source, current source, etc.) placed in series or parallel with the current-carrying winding. The rotor-mounted circuitry may, for example, include one or more one or more electronic switching devices (e.g., a triac, a silicon-controlled rectifier, solid state relay, switching transistors and/or a thyristor). Alternatively or additionally, the rotor-mounted circuitry may include linear electronic devices (e.g., a MOSFET, IGBT, bipolar transistor) and/or circuits (including circuits having non-linear devices that are set to operate in a linear regime).

The rotor-mounted circuitry may be configured to modify rotor conductor properties (e.g., real and/or imaginary components of impedance) of the rotor windings so as to control or regulate starting or running torque, to control or regulate starting or running current drawn from the utility mains, and/or to control or regulate peak electromechanical stresses on some motor component. Alternatively or additionally, the rotor-mounted circuitry may be configured to modify magnetic properties (e.g., magnetic reluctance) and/or mechanical properties (e.g., mechanical moments).

The rotor-mounted circuitry may be configured to dynamically modify a property of a current-carrying winding during motor operation in response to the sensed motor property, or a history or physical model of sensed motor properties, or an external command. For example, the rotor-mounted circuitry may be configured to modify a current and/or an impedance of the current-carrying winding. Further, the rotor-mounted circuitry may be configured to vary the property of the current-carrying winding as function of a rotor angle or position, angular rate and/or angular acceleration. The rotor-mounted circuitry may be configured to vary the property of the current-carrying winding as a continuous function. The rotor-mounted circuitry may be configured to vary the property of the current-carrying winding between a set of discrete property values.

Exemplary rotor-mounted circuitry for varying the property of the current-carrying winding may include a switch-mode regulator. The switch-mode regulator may be configured to switch the property of the current-carrying winding at a rate higher than a characteristic or nominal frequency (e.g., rotor's angular frequency, pole frequency, etc.). Thus, the property of the current-carrying winding may be varied as a function of a rotor angle or position in the course of machine operation. An effective value of the property of the current-carrying winding may be determined by a switching pulse rate and/or pulse width or amplitude of a switched variable. The nominal frequency may be any suitable frequency in consideration of machine characteristics and/or a degree of control desired. The nominal frequency may, for example, be about 10 KHz, 100 KHz, or 1 MHz.

The exemplary electrical motor may include a controller configured to supervise operation of the at least one rotor-mounted sensor and the rotor-mounted circuitry. The controller may include any suitable software, routines and/or algorithms for supervising the operation of the at least one rotor-mounted sensor and the rotor-mounted circuitry. An exemplary controller may be configured to regulate a motor operating parameter (e.g., starting current, running current, rotor temperature, power consumption, and/or torque).

An exemplary controller may include one or more rotor-mounted controller components and/or off-rotor controller components. The off-rotor components may be configured to communicate with the rotor-mounted circuitry, the at least one rotor-mounted sensor and/or the one or more rotor-mounted controller components via optical, RF, acoustic, ultrasound, induction, and/or conducting (e.g., slip ring or brush) means. The controller may be further configured to receive data inputs and commands from off-rotor sensors and/or external sources. The controller may, for example, include a signaling device which is capable of receiving or transmitting data (e.g., data pertinent to the rotor's state-or-condition or a control-setting).

Smart rotor 110 may have no wired-or-electrically-conducting connection to other parts of the motor. Smart rotor 110 may include rotor-mounted or embedded energy sources 150 (e.g., batteries, electrochemical cells, EMF power scavengers, etc.) to power operation of rotor mounted components or devices (e.g., sensors, circuitry, controllers, actuators, etc.). Alternatively or additionally, the rotor mounted components or devices may be powered by off-rotor power sources via wireless couplings (e.g., inductively and/or optically). Rotor 110 may, for example, include an inductively-coupled device (e.g., a transformer element) for this purpose. The rotor-mounted circuitry may operate without the complication of brushes or slip-rings to transfer power and/or data signals to or from external locations.

Figure 2B:
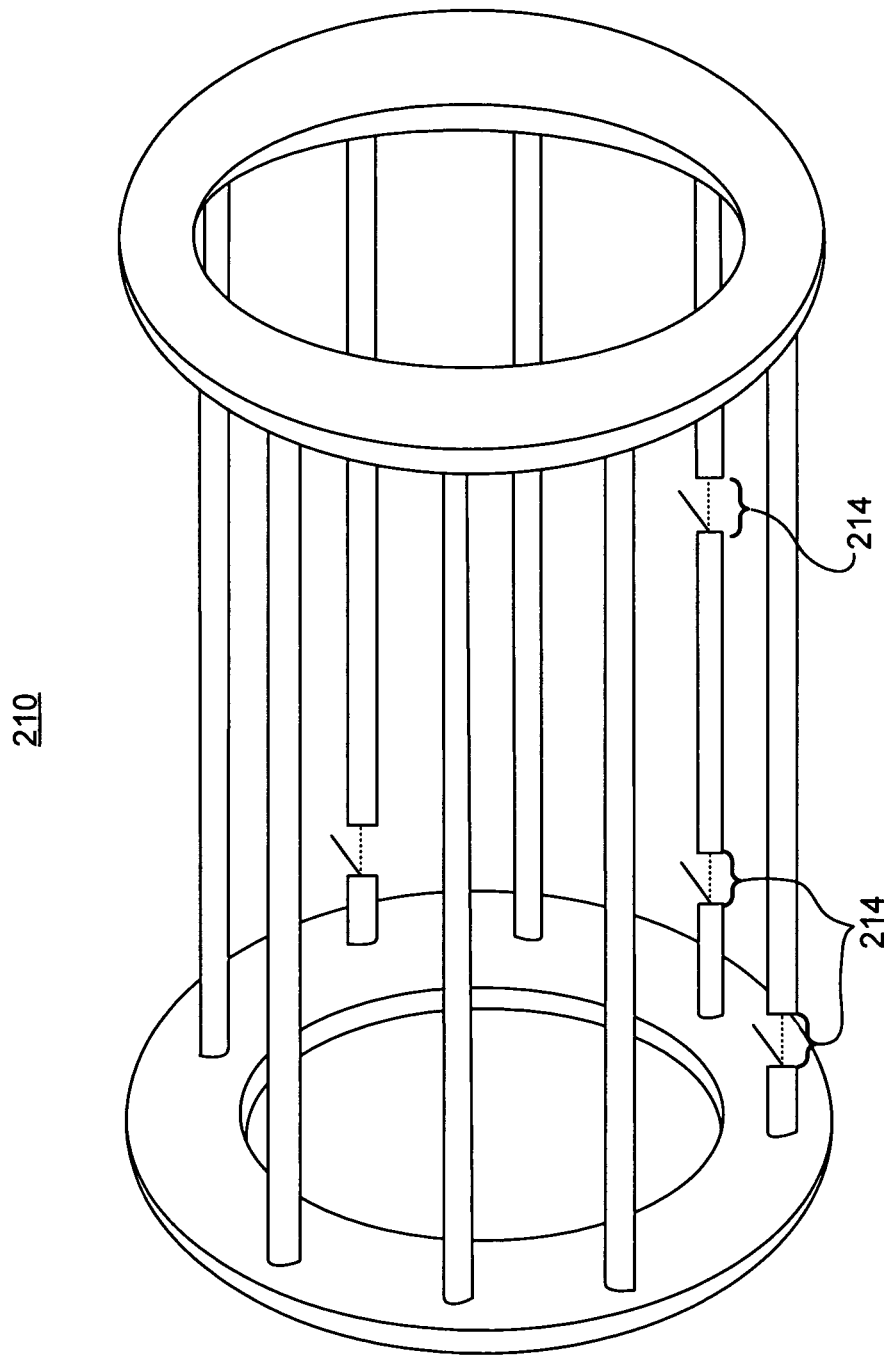

The controller may be configured to provide energy to individual rotor elements from the rotor-mounted or embedded energy sources 150 to flow currents in the rotor prior to or at motor start up (e.g., to control or regulate motor back-electromotive forces). Alternatively or additionally, the controller may be configured so that energy sources 150 receive energy from an off-rotor supply and store the same prior to or at motor start up. The controller may be configured or programmed so that energy is provided individual rotor elements from energy sources 150 according to a torque-to-load program or schedule FIGS. 2A and 2B show an exemplary induction motor 200 having a smart rotor configured, for example, as a squirrel cage rotor 210, which is disposed in a stator (e.g., stator 218 containing armature windings). An exemplary squirrel cage rotor 210 includes one or more switchable conductive bars (e.g., longitudinal bars 212) and active electrical elements to control or regulate motor operation. Induction motor 200 may include on-rotor and/or off rotor sensors (e.g. sensor 216) to sense or monitor motor parameters or conditions. The active electrical elements may, for example, include rotor-mounted circuitry 214 that is configured to switch individual bars 212 during motor operation in response to sensed motor parameters or conditions, and/or control program commands.

Rotor-mounted circuitry 214 may, for example, include transistors, circuits and switches. Rotor-mounted circuitry 214 may be configured to switch individual bars 212 to control or regulate an operational motor parameter (e.g., startup current, running current, rotor speed and/or torque). Rotor-mounted circuitry 214 may be configured to switch individual bars to control or regulate an operational motor parameter, for example, as function of one or more of a shaft angle, a magnetic field angle or phase, a motor current demand, and/or temperature. For this purpose, rotor-mounted circuitry 214 may be configured to open or close individual bars 212 during motor operation. Further, rotor-mounted circuitry 214 may be configured to connect individual bars to rotor-mounted energy sources 150 to modify or regulate motor operation (e.g., to modify a torque acting on the rotor). The rotor-mounted energy sources 150 may include one or more of inductors, capacitors, primary and/or secondary batteries, and/or other electrochemical elements on or within rotor 210.

Rotor-mounted circuitry 214 may be configured to modify rotor conductors and thus the mains-presented impedance of an induction motor. Rotor-mounted circuitry 214 may for example, include MOSFET or IGBT switches to switch rotor conductors into or out of a circuit. The rotor conductors may be switched one-or-more times during motor start-up to limit or regulate, for example, starting torque, starting-current drawn from the utility mains, and/or peak electromechanical stresses on some motor component.

FIG. 3 shows an exemplary rotor assembly 300 for a motor. Rotor assembly 300 may, for example, be a wound rotor or a squirrel cage type rotor. Rotor assembly 300 includes a rotatable body 300 (or rotor core) and one or more on-rotor sensors 320. A sensor 320 may have a sensing portion 330 coupled to a physical optical readout portion 340. Sensing portion 330 may be configured to sense a motor parameter during motor operation and display its value on optical readout portion 340. Optical readout portion 340 may be disposed, for example, on a cylindrical surface of rotor 300. Alternatively, optical readout portion 340 may be disposed on a side face of rotor 300. Optical readout portion 340 may be arranged so that it can be optically read by an external reading device 350. For example, with reference to FIG. 3, optical readout portion 340 may be arranged to be optically read by external reading device 350' disposed on a stator (e.g., stator 218) in which rotor assembly 300 is disposed.

The values of the motor parameter readout by external reading device 350 may be transmitted to a motor controller, for example, to dynamically control motor operations or to maintain a log of motor characteristics.

On-rotor sensor 320 may, for example, be a battery-powered sensor, a capacitively-powered sensor an inductively-powered sensor, an optically powered sensor, and/or a sensor powered by energy scavenged from the motor environment or operation. Optical readout portion 340 of sensor 320 may, for example, be a liquid crystal display, a micro mirror, a vibrating mirror/cornercube, an LED, and/or a MEMS-actuated flag. Optical readout portion 340 may be arranged to serially provide individual readout values of the motor parameter corresponding to a plurality of individual rotor axial/radial positions, for example, as rotor assembly 310 rotates during motor operation. Alternatively or additionally, optical readout portion 340 may be arranged to provide a multiplexed readout values of the motor parameters, for example, ones corresponding to a plurality of individual rotor axial/radial positions in motor operation.

Figure 6:
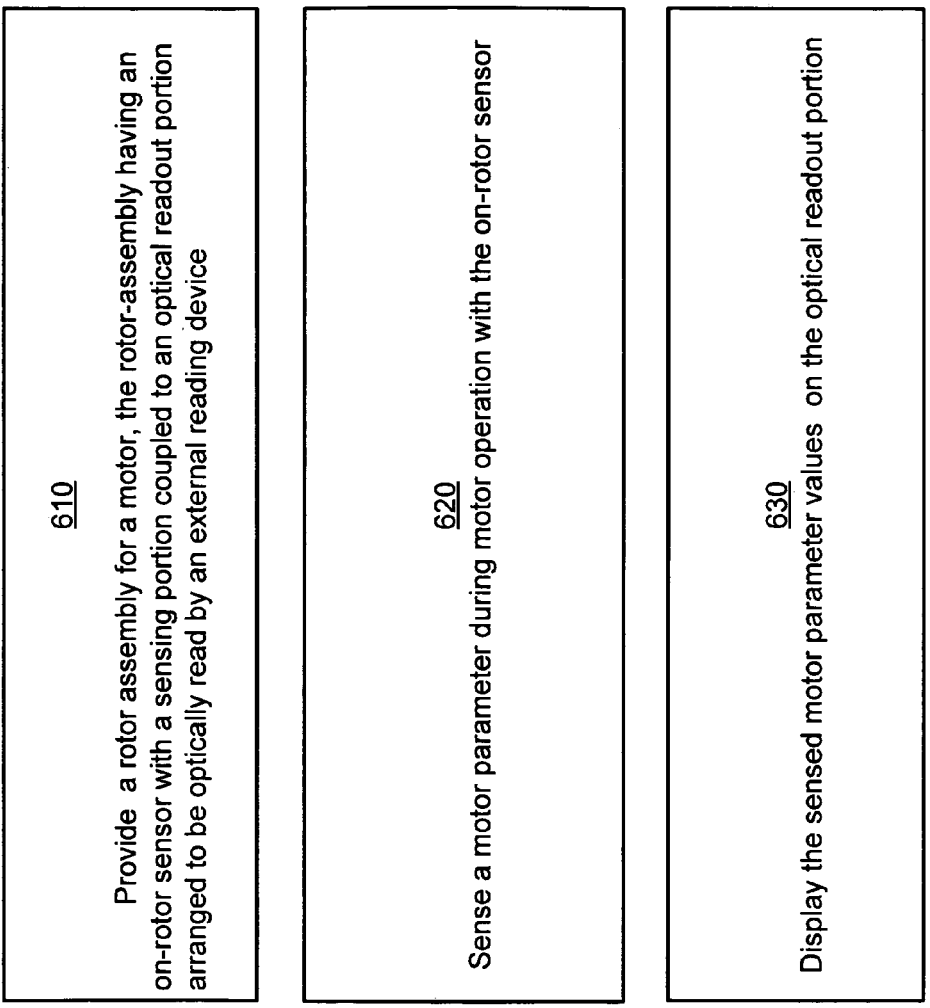

FIGS. 4, 5 and 6 are flow diagrams respectively showing exemplary features of methods 400, 500 and 600, which relate to use of smart rotors.

Method 400 includes, during operation of an electrical motor having a rotor with at least one current-carrying winding, sensing a motor property using at least one rotor-mounted sensor (410), and dynamically modifying a property of the current-carrying winding during motor operation in response to the sensed motor property (420). The sensed motor property may, for example, be one of a winding current, temperature, rotor speed, and or angular acceleration. Rotor-mounted circuitry may be used to modify a property of the current-carrying winding. The rotor-mounted circuitry may include one or more active electronic devices and/or circuits. The rotor-mounted circuitry may include one or more electronic switching devices (e.g., a triac, a silicon-controlled rectifier, solid state relay, switching transistors and/or a thyristor). Alternatively or additionally, the rotor-mounted circuitry may include one or more linear electronic devices and/or circuits (e.g., a MOSFET, IGBT, bipolar transistor). The rotor-mounted circuitry may include one or more active or passive electronic devices (e.g., resistance, inductance, capacitance, voltage source, current source) placed in series or parallel with all or a portion of the current-carrying winding. The rotor-mounted circuitry may include a switch-mode regulator or a switch-mode power supply. The switch-mode regulator may switch the property of the current-carrying winding at a rate higher than the rotor's angular frequency. An effective value of the property of the current-carrying winding may be determined by a switching pulse rate, pulse width and/or amplitude of a switched variable.

In method 400, the rotor-mounted circuitry may be used to modify a current and/or an impedance of the current-carrying winding. The rotor-mounted circuitry may be configured to vary the property of the current-carrying winding in time as function of a rotor angle or rate, for example, in a continuous function. The rotor-mounted circuitry may be configured to vary the property of the current-carrying winding between a set of discrete property values.

Further, in method 400, a controller may be deployed to supervise operation of the at least one rotor-mounted sensor and the rotor-mounted circuitry. The controller may have algorithms, routines, or programs for controlling or regulating a motor operating parameter (e.g., starting current, rotor temperature, power consumption, and/or a torque). The controller may include rotor-mounted controller components and/or off-rotor controller components. The off-rotor components communicate with the rotor-mounted circuitry, the at least one rotor-mounted sensor and/or the one or more rotor-mounted controller components by any suitable means (e.g., via optical, RF, induction, acoustic, and/or brush connection means). The controller may receive data inputs and commands from off-rotor sensors and/or external sources.

With reference to FIG. 5, method 500 includes, in an induction motor having a squirrel cage rotor with conductive bars or circuits, sensing a motor characteristic during motor operation (510), and switching one or more individual conductive circuits in the rotor during motor operation to control or regulate an operational motor parameter (520). The controlled or regulated operational motor parameter may, for example, be one of startup current, rotor speed and/or torque.

In method 500, switching conductive circuits may include open- or close-circuiting individual bars and/or connecting individual circuits to rotor-mounted energy sources. The rotor-mounted energy sources may include one or more of inductors and/or capacitors, switch mode power supplies, a primary and/or a secondary battery, etc. The method may include recharging an energy storage element during motor operation. Alternatively or additionally, the method may include receiving energy from an off-rotor supply and storing the same in the rotor-mounted energy sources prior to motor start up. The method may include providing energy to individual elements from the rotor-mounted energy sources to flow currents in the rotor prior to motor start up (e.g., to regulate or control motor back-electromotive forces). The energy may be provided to individual elements from the rotor-mounted energy sources according to for, example, a torque-to-load program or schedule.

Further, switching conductive bars may include deploying circuitry configured to switch individual circuits to control an operational motor parameter as function of one or more of a shaft angle, a magnetic field angle or phase, a motor current draw and/or a sensed temperature. The circuitry may, for example, include diodes, transistors, and switching-mode or other power supplies.

With reference to FIG. 6, method 600 includes providing a rotor assembly for a motor (610). The rotor-assembly may include an on-rotor sensor with a sensing portion coupled to an optical readout portion arranged to be optically read by an external reading device. The on-rotor sensor may, for example, be one of a battery-powered sensor, an inductively-powered sensor and/or an optically powered sensor. The optical readout portion may, for example, be one or more of a liquid crystal display, a micro mirror, an LED, an actuated mirror/cornercube, and/or a MEMS-actuated flag. Method 600 further includes sensing a motor parameter during motor operation (620), and displaying the sensed motor parameter values on the optical readout portion (630).

In method 600, the optical readout portion may be arranged to be optically read by the external reading device disposed on or about a stator with respect to which the rotor assembly rotates.

Further, the optical readout portion may be arranged to serially or in parallel provide individual readout values of the motor parameter corresponding to a plurality of individual rotor axial/radial parameters. Alternatively or additionally, the optical readout portion may be arranged to provide multiplexed readout values of the motor parameter corresponding to a plurality of individual rotor axial/radial parameters.

In the detailed description, reference is made to the accompanying drawings, which form a part hereof. In the drawings, similar symbols typically identify similar components, unless context dictates otherwise. The illustrative embodiments described in the summary, detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The detailed description herein sets forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processing circuits (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processing circuits (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems for generation, transmission and distribution of electrical power, a communications system (e.g., a networked system, a telephone system, a Voice over IP system, wired/wireless services, etc.).

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The subject matter described herein sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. For example, even through the solutions described herein are in the context of electrical rotation machinery including motors and generators, the same or similar solutions are applicable to linear/stepper motors and generators, etc.

Further, for example, rotor properties may be modified during machine operation by rotor-mounted actuators or electro-mechanical devices. The rotor-mounted actuators or electro-mechanical devices may be deployed in addition to or instead of the rotor-mounted circuitry described herein with respect to FIGS. 1-6. The rotor-mounted actuators or electro-mechanical devices may include mechanisms for changing the mechanical configuration or properties of a rotor (e.g., rotor moment distribution, pitch of turbine blades, etc.). The mechanisms may, for example, include counter weights, torque-limiting loads, stabilizers, electromechanical clutches, displaceable shaft-mounted rotor components, etc.

Further, for example, rotor-mounted controller components and/or off-rotor controller components of a rotating machine may include suitable interfaces to digital networks. Such interfaces may allow for system wide remote control or supervision of one or more rotating machine. Each rotating machine (e.g., a turbine or generator) in a system may be individually addressable over the interconnecting network.

Other aspects of the subject matter describe herein relate to managing component heating during electrical machine operation. Overheating of machine components may result in poor short-term and/or long-term structural changes that adversely affect machine performance. Managing the heating of machine components can lead to maintaining or improving machine performance.

Cooling systems or mechanisms for motor-windings may involve at-least-one coolant-passage in intimate thermal contact with machine portions (e.g., a coolant passage at-leasthalf-surrounded by windings). A coolant fluid may be circulated through the coolant passage to remove heat or transfer heat from a machine portion. The cooling fluid may be force-advected with a pumping mechanism which, for example, is internal to the motor and is integral to it. The pumping mechanism may draw its pressure-gradient from thermal or electromagnetic aspects of motor-structure and operation. A provision for coolant-liquid being pressurized may use free-energy gradients directly associated with AC excitation (e.g., via electric or magnetic field gradients involving high-k dielectric or ferro-fluids, respectively) and (in some cases) rectified into unidirectional flows via asymmetric valves. Other provisions for fluid flow may involve cyclic-pulsation or oscillatory coolant-flows; thermo-siphon cooling of rotor structures (exploiting centrifugal pseudopotentials); and/or for vapor-phase heat-transport. The cooling mechanisms may include provision for variable-structured/geometry heat-exchange/rejection (e.g., ones actuated by varying temperature or (e.g., vapor) pressure of a portion of the coolant liquid (or by a material—solid or liquid or gas—thermally coupled thereto)). The cooling mechanisms may be configured so that this variable structure is wholly or partially on or coupled to the rotor or rotating shaft-or-bearing of the motor. Such structures may an airfoil-element which moves a gaseous heat-sink. The cooling mechanisms may include actuators that involve the transient opening of normally-enclosed motor's internal structure to external airflow. The actuators may be configured to selectively open or close in response to machine and cooling system parameters (e.g., mass-flow, temperature-change, etc.) The airflow may be filtered or otherwise conditioned for admittance to at least a portion of the motor's internal volume.

The cooling systems/mechanisms may involve use of phase-changing materials as heat-absorbers, including 'forced' evaporation of a liquid (e.g., water) brought into contact with a (selected) portion of the motor system or portion of the cooling system thereof. The cooling systems/mechanisms may involve use of a reservoir containing a limited quantity of such material for 'emergency' or 'over-rating' cooling for a finite duration or for a finite 'over-rating' power-time product. Sensors or other devices (e.g., timers) may provide signals or indications for alerting reconsumable-use, need for reservoir-recharging, etc.

The machine integrated cooling systems/mechanisms described herein for managing the heating of machine components may lead to compact and/or mass-economized electric motors, e.g., for vehicle applications, that are highly efficient in low-power-&-extended duration operations but which are also capable of intermittent 10-1000 second 'burst-mode' operations (e.g., for maximum-braking and grade-climbing purposes) at far higher (~10×) power levels.

Exemplary systems, mechanisms and techniques for heat removal from motor windings and components are described herein with reference to FIGS. 7A, 7B, . . . 11A, and 11B. In particular, the exemplary systems, mechanisms and techniques for heat removal relate to active heat removal from motor windings and components during motor operation. The active heat removal systems and techniques described herein are not limited to the motors with rotor mounted control circuitry (e.g., those described with reference to FIGS. 1-6), but may be deployed in any type of motor with or without rotor mounted control circuitry. The systems and techniques for active heat removal from motor windings may be fully or partially automated and/or used just as needed.

The machine integrated cooling systems/mechanisms described herein (e.g., with reference to FIGS. 7A-11B) may be designed and practically implemented in conjunction with conventional thermal models of electrical machines that are based, for example, on component structure, material properties, thermodynamics and involve full analytic or finite element analysis as appropriate. The conventional thermal models for machine component heating may be similar to those available, for example, at website motor-design.com/downloads/CWIEME_2009_PaperMDL.pdf. This particular web-available model describes a motor thermal modeling code (Motor-CAD) with both continuous wave and transient thermal analysis, and includes models for cooling mechanisms for various thermal situations or conditions including (from http://www.motor-design.com/cooling.php) natural convection, forced convection, through ventilation, water jackets (several configurations), submersible, wet rotor and wet stator, spray cooling, radiation, conduction, etc.

FIG. 7A shows an exemplary electrical machine/motor winding cooling system 700 that utilizes a ferrofluid to convectively transfer heat away from the one or more heat transfer surfaces 750 in stator 710 and/or rotor 720 of an electrical machine 700. Heat transfer surfaces 750 may have structure including one or more microchannels (e.g., a honeycomb-like or other porous structure). The ferrrofluid may be any suitable combination or colloidal mixture of microscopic ferromagnetic or ferrimagnetic particles (e.g., magnetite, hematite or some other compound containing iron) and a carrier fluid (e.g., water, oil, or solvent).

Electrical machine 700 includes a "cooling" ferrofluid circuit 770 having fluid conductive channels or passages 740 carrying the heat-transferring ferrofluid to and from heat transfer surfaces 750. Electrical machine 700 may, for example, be a motor, a generator, a dynamoelectric machine, an alternator, a condenser, or any other type of electrical machine. The heat conductive passages may be closed so that a ferrofluid charge therein is contained and is recirculated in operation. Further, the ferrofluid circuit may include a fluid-conductive passage 740 leading from a ferrofluid reservoir 760 to at least one of heat transfer surfaces 750. Ferrofluid reservoir 760 may be suitably disposed relative to an electrical machine 700. For example, Ferrofluid reservoir 760 may be attached to or embedded in the stator and/or the rotor, or placed at a location external to the stator and the rotor. An exemplary ferrofluid circuit may have a closed loop fluid-conductive passage 740 having a portion that is proximate to one of heat transfer surfaces 750.

Ferrofluid circuit 770 may be coupled to one more heat sinks that are configured to receive heat from the ferrofluid circuit. The heat sinks may be internal or external to the rotor and/or stator. The coupling of ferrofluid circuit 770 to the one more heat sinks may include arrangements for liquid-liquid and/or liquid-gas heat exchange.

Any suitable prime movers may be deployed to move the ferrofluid through the ferrofludic circuit. For example, ferrofluid circuit 770 may utilize a magnetic field or magnetic field gradient to drive the ferrofluid therein. The ferrofluid circuit may have a design allowing moving magnetic fields/gradients that may be generated by a stator and/or rotor winding during machine operation to be used as the prime mover. Additionally or alternatively, the magnetic fields/gradients may be externally applied magnetic fields/gradients that are independent of or in addition to magnetic fields/gradients may be generated by a stator and/or rotor winding. Further for example, the ferrofluid circuit may include a pump (e.g., a mechanical or a pneumatic pump) configured to move the ferrofluid therein. The pump may be disposed at any suitable position relative to the electrical machine and the ferrofluidic circuit. The pump may for example be disposed external to the stator and the rotor, or embedded in the stator or the rotor.

In addition to "cooling" ferrofluidic circuit 770, electrical machine 730 may include one or more additional cooling mechanisms or arrangements. Examples of such additional cooling mechanisms or arrangements include a spray cooling arrangement, a direct conductor cooling arrangement, a totally-enclosed, non-ventilated natural convention arrangement, a totally-enclosed, fan-cooled forced convection arrangement, a through ventilation arrangement, a radiation cooling arrangement, a stator water jacket, a rotor water jacket, a submersible arrangement. Electrical machine 730 may for example, include a sprayer configured to spray a cooling agent on hot surfaces or hot spots during machine operation.

FIG. 7B shows an exemplary method 70 for removing or transferring heat from rotor and/or stator portions of an electrical machine. Method 70 includes flowing a ferrofluid to one or more heat transfer surfaces in the rotor and/or stator portions (70a). The heat transfer surfaces may include microchannels. Heat in the rotor and/or stator is conductively or radiatively transferred across the heat transfer surfaces to the flowing ferrofluid. Method 70 further includes flowing the heated ferrofluid away from the one or more heat transfer surfaces to convectively carry the heat to a cooler heat sink or location (70b). Method 70 may be implemented in any suitably configured electrical machine (e.g., a motor, a generator, a dynamoelectric machine, an alternator, and a condenser). The electrical machine may, for example, be suitable configured to have a fluid-conductive passage leading from a ferrofluid reservoir to at least one of the heat transfer surfaces. The fluid-conductive passage may be a closed loop fluid-conductive passage having a portion that is proximate to one of the heat transfer surfaces. Further the ferrofluid reservoir may, for example, be embedded in or attached to the stator and/or the rotor or be external to the stator and the rotor. Method 70 may include flowing the ferrofluid through the fluid-conductive passage to or from the one of the heat transfer surfaces.

Method 70 may further include coupling the ferrofluid conductive passage to one more heat sinks and transferring heat from the ferrofluid to the heat sinks. The heat sinks may be internal or external to the rotor and/or stator. Transferring heat from the ferrofluid to the heat sinks may involve liquid-liquid and/or liquid-gas heat exchange.

Flowing the ferrofluid through the fluid conductive passage (70a and 70b) may include flowing the ferrofluid passively responsive to rotational movement of the rotor, passively responsive via its temperature-dependent permeability to temperatures in the electrical machine, and/or actively controlling the flow. For example, flowing the ferrofluid through the fluid conductive passage (70a and 70b) may be accomplished by using a magnetic field gradient or using a varying magnetic field to drive the ferrofluid. The magnetic fields/gradients may be generated by a stator and/or rotor winding during machine operation and/or result from magnetic materials present in the stator and/or rotor structure. Alternatively or additionally, flowing a ferrofluid through the fluid conductive passage may involve using a pump (e.g., a pneumatic or mechanical pump) to drive the ferrofluid. The pump may be embedded in the stator or the rotor and/or be disposed externally.

Method 70 may further include spraying a cooling agent as an additional way for cooling or removing heat from a stator or rotor portion.

Figure 8A:
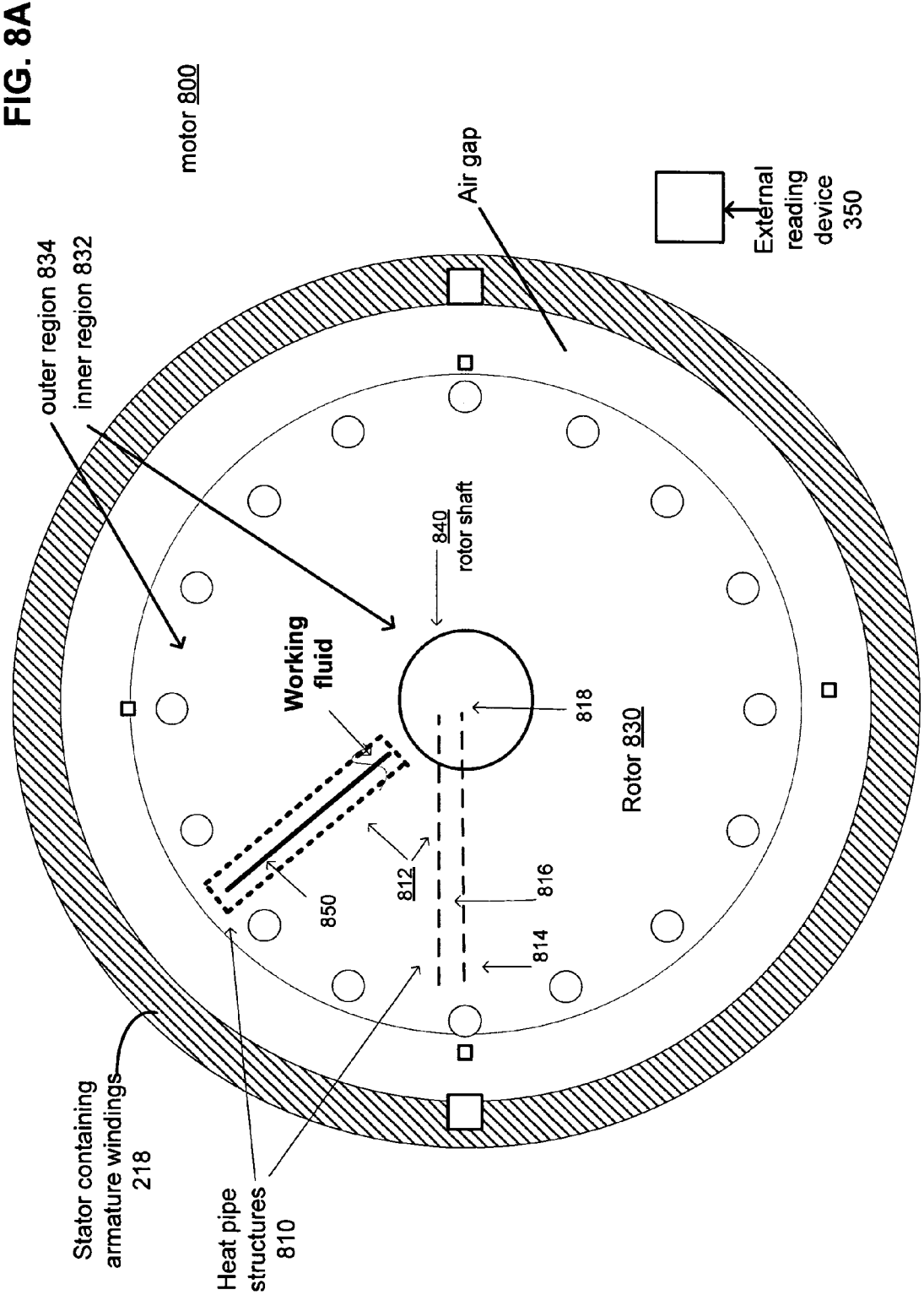

FIG. 8A shows an exemplary electrical machine 800 that utilizes a heat pipe structure 810 to transfer heat away from the one or more or hot spots or regions. Heat pipe structure 810 may exploit the thermodynamics (e.g., latent heat of evaporation/condensation) of a suitable working fluid to transfer heat. Electrical machine 800 may for example, include a rotor body 830 disposed on a rotor shaft 840 and configured to rotate with respect to a stator. Rotor body 830 has an inner region 832 proximate to rotor shaft 840 and an outer region 834 proximate to the stator. Heat pipe structure 810 may include one or more sealed heat pipes (e.g., pipe 812), each having a liquid evaporation zone (e.g., 814), a vapor (evaporated liquid) transport passage (e.g., 816) and a condensation zone (e.g., 818).

With respect to FIG. 8A, heat pipe 812 may be disposed partially in rotor body 830 with its liquid evaporation zone 814 in or proximate to outer region 834 of the rotor proximate to the stator, its condensation zone 818 disposed outside the rotor body 830. Its vapor/evaporated liquid transport passage 816 may extends substantially radially from liquid evaporation zone 814 through inner region 832 toward shaft 840 and further extend through shaft 840 to condensation zone 818 outside rotor body 830. Vapor/evaporated liquid transport passage 816 may include a plurality of dendrite passageways 816 extending from or through the outer region 834 toward rotor shaft 840 (FIG. 8C).

Heat pipe structure 810 may include a return loop configured to move recondensed liquid from the condensation zone 818 to the liquid evaporation zone 814. The return loop may be co disposed internal or external to or along vapor/evaporated liquid transport passage 816. An exemplary return loop may, for example, be an arrangement that uses centrifugal forces to move recondensed liquid from condensation zone 818 to the liquid evaporation zone 814. Further, an exemplary return loop may, for example, include a capillary and/or wicking structure 850 configured to move recondensed liquid from the condensation zone to the liquid evaporation zone. Capillary and/or wicking structure 850 may be configured to retain liquid in liquid evaporation zone 814 by surface tension when rotor body 830 is stationary or low rotation speeds.

With reference to FIG. 8C, heat pipe structure 810 may include an arrangement one or more "outer" heat pipes 852 and one or more "inner" heat pipes 854 disposed in the outer and inner regions 834 and 832 of rotor body 830, respectively. In the arrangement one or more inner heat pipes 854 may be are thermally coupled to the one or more outer heat pipes 852 to transport heat from the one or more outer heat pipes toward rotor shaft 840. The one or more outer heat pipes and the one or more inner heat pipes may contain respective types of outer and inner heat pipe working fluids that are, for example, selected respectively to operate between an outer region temperature and an intermediate temperature, and the intermediate temperature and a rotor shaft temperature.

FIG. 8B shows an exemplary method 80 for removing or transferring heat from rotor and/or stator portions of an electrical machine. Method 80, for example, includes providing a rotor body disposed on a rotor shaft configured to rotate with respect to a stator (81). The rotor body may have an inner region proximate to the rotor shaft and an outer region proximate to the stator. Method 80 further includes using a heat pipe structure at least partially disposed in the rotor body to transfer heat from the rotor portions (82). The heat pipe structure may have a liquid evaporation zone, a vapor (evaporated liquid) transport passage, and a condensation zone to transfer heat. The liquid evaporation zone may be disposed in the rotor body in or proximate to the outer region of the rotor proximate to the stator, while the condensation zone may be disposed outside the rotor body. Further, the vapor (evaporated liquid) transport passage may extend substantially radically from the liquid evaporation zone through the inner region toward the shaft and further extend through the shaft to the condensation zone outside the rotor body. The vapor transport passage may include a hollow portion of the shaft. Method 80 may include transferring heat through the hollow portion of the shaft. Further, in method 80 using a heat pipe structure (82) may include using a return loop configured to move recondensed liquid from the condensation zone to the liquid evaporation zone. The return loop may include an arrangement configured to use centrifugal forces to move recondensed liquid from the condensation zone to the liquid evaporation zone. The return loop may include a capillary and/or wicking structure configured to move recondensed liquid from the condensation zone to the liquid evaporation zone. The capillary and/or wicking structure may be configured to retain liquid in the liquid evaporation zone by surface tension when the rotor body is at zero or low rotation speeds.

Further, in method 80 using a heat pipe structure (82) may include using a heat pipe structure having a plurality of dendrite passageways extending from or through the outer surface region toward shaft. The dendrite passageways may include interconnected passageways with an outer region passageway having a smaller cross section than an inner region passageway.

Additionally or alternatively, in method 80 using a heat pipe structure (82) may include using one or more "outer" heat pipes and one or more "inner" heat pipes disposed in the outer surface region and the inner region of the rotor body, respectively. The one or more inner heat pipes may be thermally coupled to the one or more outer heat pipes to transport heat from the one or more outer heat pipes toward the rotor shaft. Further, the one or more outer heat pipes and the one or more inner heat pipes contain respective types of outer and inner heat pipe working fluids that are suitably selected with consideration of the expected temperature ranges of operation and the thermodynamic properties of the working fluids.

Figure 9A:
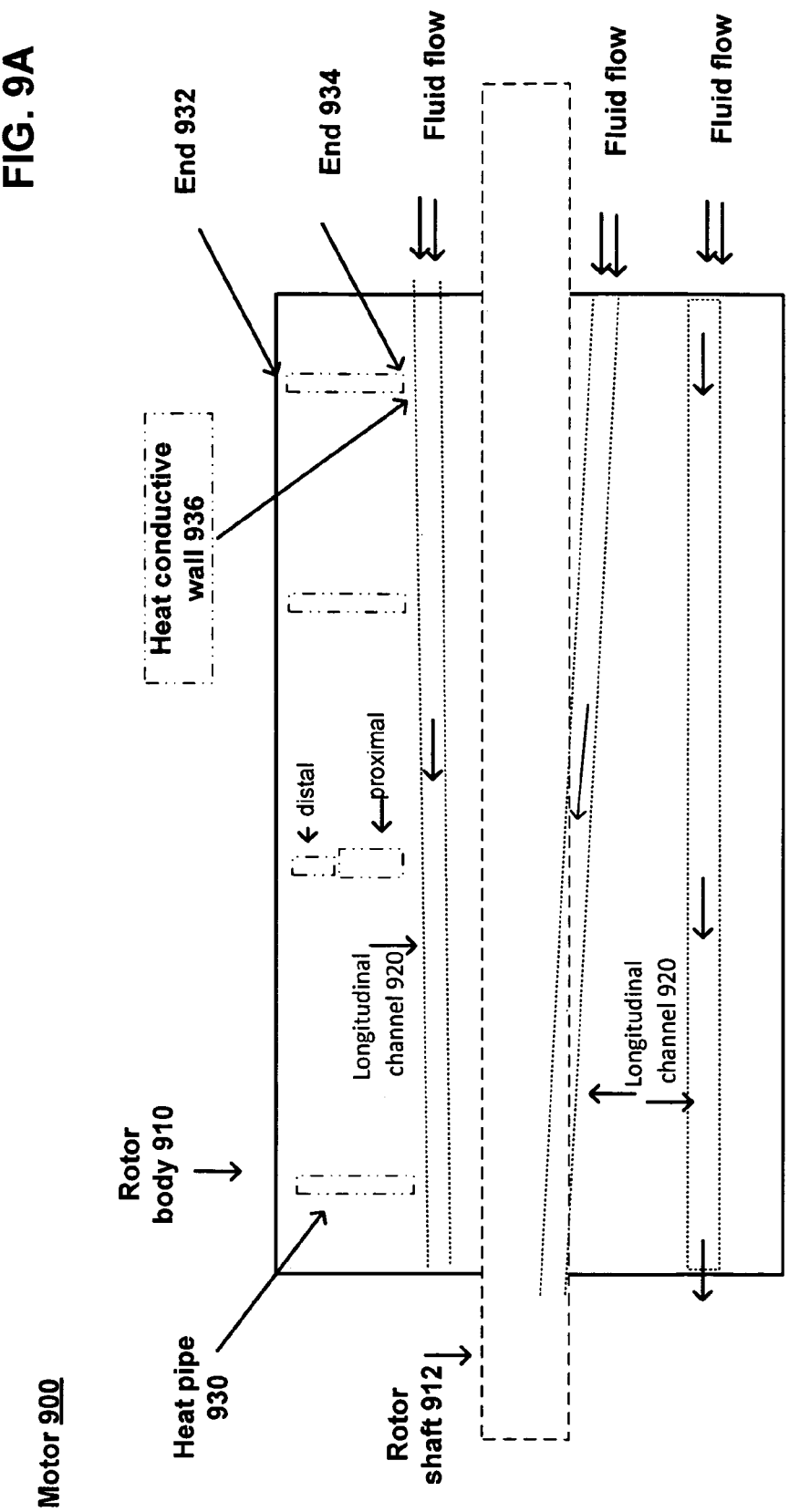

FIG. 9A shows an exemplary motor 900 with a cooling system that utilizes fluids to carry to carry heat out of a rotor body 910, which is arranged to rotate with respect to a stator about a longitudinal shaft 912 in an electrical machine. The heat carry-fluids may flow through one or more fluid-carrying channels (e.g., a substantially longitudinal channel 920) through rotor body 910. The direction or orientation of substantially longitudinal channel 920 may be referenced with respect to the axis of the longitudinal shaft. Substantially longitudinal channel 920 may be co-disposed in or along longitudinal shaft 912. Substantially longitudinal channel 920 may, for example, be disposed substantially parallel to but substantially outside longitudinal shaft 912. Substantially longitudinal channel 920 may be configured to carry a cooling gas (e.g., air, helium, nitrogen, argon Freon or any combination thereof) to carry heat of the rotor body.

Motor/cooling system 900 further includes at least one substantially transverse heat pipe 930 having a first end 932 disposed in a portion of rotor body 910 proximate to the stator and a second end 934 separated from the at least one substantially longitudinal channel by a heat conductive wall 936. Heat pipe 930 may be disposed in rotor body 910 in a substantially transverse direction with reference to the axis of longitudinal shaft 912. At least one substantially transverse heat pipe 930 may be configured to transfer heat from the portion of rotor body 910 proximate to the stator through or across the heat conductive wall into substantially longitudinal channel 920. The cooling fluid in the substantially longitudinal channel 920 carries the transferred heat out of the rotor body.

In general, at least one substantially transverse heat pipe 930 includes a condensing zone proximate to the heat conductive wall and a distal evaporative zone in the direction of the stator. Further, heat pipe 930 (like heat pipe structure 810) may include a return loop configured to move recondensed liquid from the condensation zone to the liquid evaporation zone. The return loop may be co disposed internal or external to or along vapor/evaporated liquid transport passage in heat pipe 930. An exemplary return loop may, for example, be an arrangement that uses centrifugal forces to move recondensed liquid from the condensation zone to the liquid evaporation zone. Further, an exemplary return loop may, for example, include a capillary and/or wicking structure (e.g., wicking structure 850) configured to move recondensed liquid from the condensation zone to the liquid evaporation zone. The capillary and/or wicking structure may be configured to retain liquid in liquid evaporation zone by surface tension when rotor body 910 is stationary or low rotation speeds.

Further, at least one substantially transverse heat pipe 930 (like heat pipe structure 810, FIG. 8C) may include a dendritic evaporative zone volume leading to a condensation zone proximate to the heat conductive wall. Further, at least one substantially transverse heat pipe 930 may include a distal heat pipe coupled to a proximal heat pipe. A condensing zone of the distal heat pipe may be thermally coupled to an evaporative zone of the proximal heat pipe, and a condensing zone of the proximal heat pipe may be thermally coupled to the heat conductive wall. Each of the heat pipes (proximal and distal) may have different respective working fluids that are suitably selected, for example, in consideration of the expected temperature ranges of their operation and the thermodynamic properties of the working fluids.

FIG. 9B shows an exemplary method 90 for removing or transferring heat from rotor and/or stator portions of an electrical machine. Method 90, as implemented in a rotor having a rotor body configured to rotate with respect to a stator about a longitudinal shaft, may include deploying at least one substantially longitudinal channel configured to flow a cooling fluid therethrough to carry heat out of the rotor body (91). The cooling fluid may be gaseous and/or may have a condensed phase component (e.g., a liquid, slurry or an aerosol). Deploying at least one substantially longitudinal channel (91) may include deploying the at least one substantially longitudinal channel disposed in the longitudinal shaft or substantially parallel to but substantially outside the longitudinal shaft. The at least one substantially longitudinal channel may be configured to carry a suitable cooling gas (e.g., air, helium, nitrogen, argon Freon or any combination thereof.

Method 90 further includes deploying at least one substantially transverse heat pipe having a first end disposed in a portion of the rotor body proximate to the stator and a second end separated from the at least one substantially longitudinal channel by a heat conductive wall (92). The at least one substantially transverse heat pipe may be configured to transfer heat from the portion of the rotor body proximate to the stator across the heat conductive wall to the cooling fluid in the at least one substantially longitudinal channel to remove heat out of the rotor body. The at least one substantially transverse heat pipe may include a condensing zone proximate to the heat conductive wall and a distal evaporative zone in the direction of the stator. The at least one substantially transverse heat pipe may include a dendritic evaporative zone volume leading to a condensation zone proximate to the heat conductive wall. In some implementations the at least one substantially transverse heat pipe may include a distal heat pipe coupled to a proximal heat pipe. In such case, a condensing zone of the distal heat pipe may be thermally coupled to an evaporative zone of proximal heat pipe and a condensing zone of the proximal heat pipe may be thermally coupled to the heat conductive wall. Further the distal heat pipe and the proximal heat pipe have different respective working fluids.

Method 90 may include utilizing centrifugal forces to move a working liquid from the condensing zone to the distal evaporative zone and/or using a capillary and/or wicking structure configured to move a working liquid from the condensing zone to the distal evaporative zone. The capillary and/or wicking structure may be configured to retain the working liquid in the distal evaporative zone even when the rotor is stopped or at low speeds.

Figure 10A:
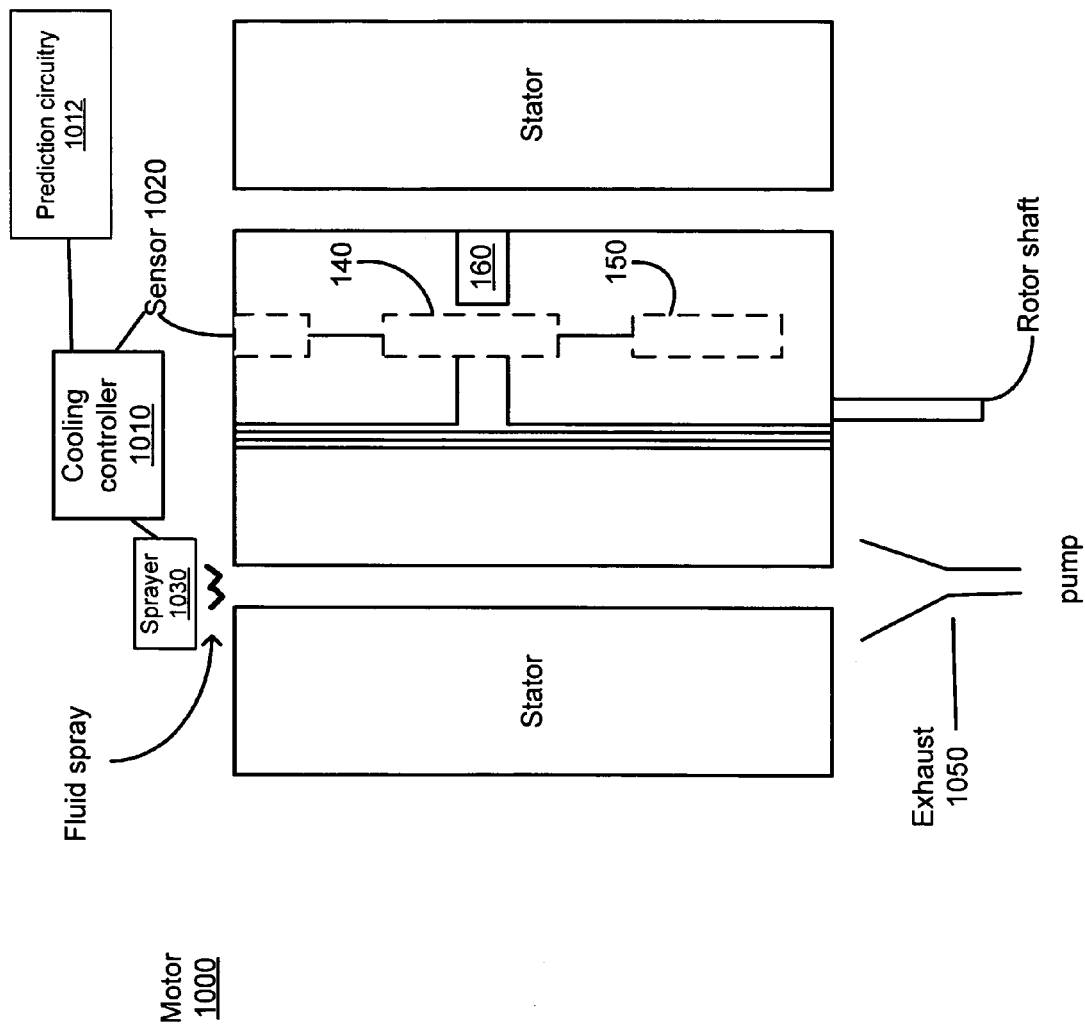

FIG. 10A shows another exemplary an electrical machine 1000 including a rotor component configured to rotate with respect to a stator component. Electrical machine 1000 includes a first cooling arrangement to cool one or more or local hot spots or regions in the machine. The cooling arrangement includes a cooling controller 1010 coupled to temperature sensing arrangement 1020 and a fluid sprayer 1030. Temperature sensing arrangement 1020 may be configured to sense or predict transient temperature increases at one or more machine locations during machine operation. Further, cooling controller 1010 may be configured to activate fluid sprayer 1030 to spray cooling fluid on a portion of the machine in response to the sensed or predicted transient temperature increases. Fluid sprayer 1030 may, for example, spray cooling fluid on a portion of a stator and/or a rotor component (e.g., a conductor or winding). The sprayed-on portion may be within or internal to the stator and/or rotor component. Additionally or alternatively, fluid sprayer 1030 may be configured to spray cooling fluid in an air gap between the stator and rotor components.

The cooling fluid (e.g., an evaporative fluid) used may be sourced from a fluid reservoir that is disposed either external or internal to electrical machine 1000. Further, electrical machine 1000 may include an exhaust structure 1050 designed to vent to vent evaporated cooling fluid. Electrical machine 1000 may also include a fluid recycling structure configured to recycle the cooling fluid sprayed on the portion of the machine.

Electrical machine 1000 may also include one or more other cooling arrangements (e.g., machine/cooling system 700, machine/cooling system 800, machine/cooling system 900, etc.). The one or more other cooling arrangements may act independently or in conjunction with first cooling arrangement to cool portions of the machine. The one or more other cooling arrangements may for example, cool portions of the machine independently of sensed transient temperature increases sensed by the first cooling arrangement.

Electrical machine 1000 may optionally include prediction circuitry 1012 coupled to cooling controller 1010. Prediction circuitry 1012 may be configured to project machine component heating under a machine operation scenario. For this purpose, prediction circuitry 1012 may include suitable computational algorithms and models of machine behavior (e.g., thermal behavior) to compute or project heating of machine portions under the machine operation scenario. Prediction circuitry 1012 may be further configured to estimate available cooling capacity under the machine operation scenario. Electrical machine 1000 may include a sensor configured to determine an amount of available cooling fluid (e.g., in the fluid reservoir or source). Prediction circuitry 1012 may, for example, estimate available cooling capacity for the first cooling arrangement based on the sensed amount of available cooling fluid.

Prediction circuitry 1012 may be further configured to provide an alternate machine operation scenario in an instance where the available cooling capacity is insufficient to counteract the projected component heating under the machine operation scenario. An alternate machine operation scenario may, for example, including limiting machine load and/or limiting the time of machine operation.

An alternate or modified electrical machine 1000 may include a sensing arrangement configured to sense electrical, magnetic, and/or mechanical machine parameters in addition to or as an alternate to temperature. The sensing arrangement may be coupled to a cooling controller (e.g., cooling controller 1010) and fluid sprayer 1030. The cooling controller may be configured to activate the fluid sprayer to spray cooling fluid on a portion of the machine in response to the sensed electrical, magnetic, and/or mechanical machine parameters. The sensing arrangement may be configured to sense, for example, mechanical machine parameters including one or more of air gap separation, component dimension, rotation speed, acceleration, and torque, and/or electrical and/or magnetic parameters including one or more of voltage, current, capacitance, inductance, resistance, phase, frequency permeability, magnetic susceptibility, electrical and/or magnetic field strength. The sensing arrangement may be configured to sense electrical and/or magnetic parameters in rotor and/or stator circuitry and/or differences between rotor and/or stator circuitry. The sensing arrangement may, for example, be configured to detect rotor/stator slippage.

Alternate or modified electrical machine 1000 may include a second cooling arrangement configured to cool machine components independent of the sensed electrical and/or mechanical machine parameters. Cooling controller 1010 may be configured to (for example, in conjunction with prediction circuitry 1012) to activate the fluid sprayer to spray cooling fluid on a portion of the machine in response anticipated electrical, magnetic and/or mechanical machine parameters.

FIG. 10B shows an exemplary method 10 for removing or transferring heat from rotor and/or stator portions of an electrical machine having a rotor component configured to rotate with respect to a stator component. Method 10 includes sensing transient temperature increase at one or more machine locations during machine operation (11) and activating a fluid sprayer to spray cooling fluid on an internal or external portion of the machine in response to the sensed transient temperature increases (12). The portion of the machine which is sprayed on corresponds to a stator and/or a rotor component (e.g., a conductor or winding) and/or an air gap between the stator and rotor components. Method 10 may source the cooling fluid from an internal or external reservoir and may include recycling of the sprayed-on fluid. The cooling fluid may be suitably selected to be an evaporative cooling fluid (e.g. one that evaporates at the temperatures of the sprayed-on portion). Method 10 may further include venting the evaporated fluids through suitable exhaust structures. Further, activating the fluid sprayer (12) may be independent of the sensed transient temperature increases but may be carried out or conducted in response to other machine operation parameters, for example, one or more of rotation speed, acceleration, and torque. Method 10 may further include deploying a second cooling arrangement configured to cool machine components independent of the sensed transient temperature increases (13).

An alternate or modified method 10 may involve sensing electrical, magnetic, and/or mechanical machine parameters in addition to or as an alternate to sensing temperature and activating a fluid sprayer to spray cooling fluid on an internal or external portion of the machine in response to the sensed electrical, magnetic, and/or mechanical machine parameters. The sensed mechanical machine parameters may include one or more of air gap separation, component dimension, rotation speed, acceleration, and torque. The sensed electrical and/or magnetic parameters may include one or more of voltage, current, capacitance, inductance, resistance, phase, frequency, permeability, magnetic susceptibility, electrical and/or magnetic field strength. The sensed electrical and/or magnetic parameters may be in rotor and/or stator circuitry parameters, and/or differences between rotor and/or stator circuitry (e.g., rotor/stator slippage). Activating the fluid sprayer to spray cooling fluid on an internal or external portion of the machine may involve activating the fluid sprayer to spray cooling fluid on a portion of the machine in response anticipated electrical, magnetic and/or mechanical machine parameters.

Alternate or modified method 10 may involve may deploying a second cooling arrangement configured to cool machine components independent of the sensed electrical and/or mechanical machine parameters.

In some implementations method 10 may include predicting machine component heating under a machine operation scenario and activating the fluid sprayer to spray cooling fluid according to the predicted heating. Predicting machine component heating may include estimating available cooling capacity under the machine operation scenario. Estimating available cooling capacity may include deploying a sensor configured to determine an amount of available cooling fluid. In instances where the estimated cooling capacity is insufficient to counteract the projected component heating under the machine operation scenario, method 10 may include providing an alternate machine operation scenario. The alternate machine operation scenario may, for example, include limiting machine load and/or limiting the time of machine operation.

Figure 11A:
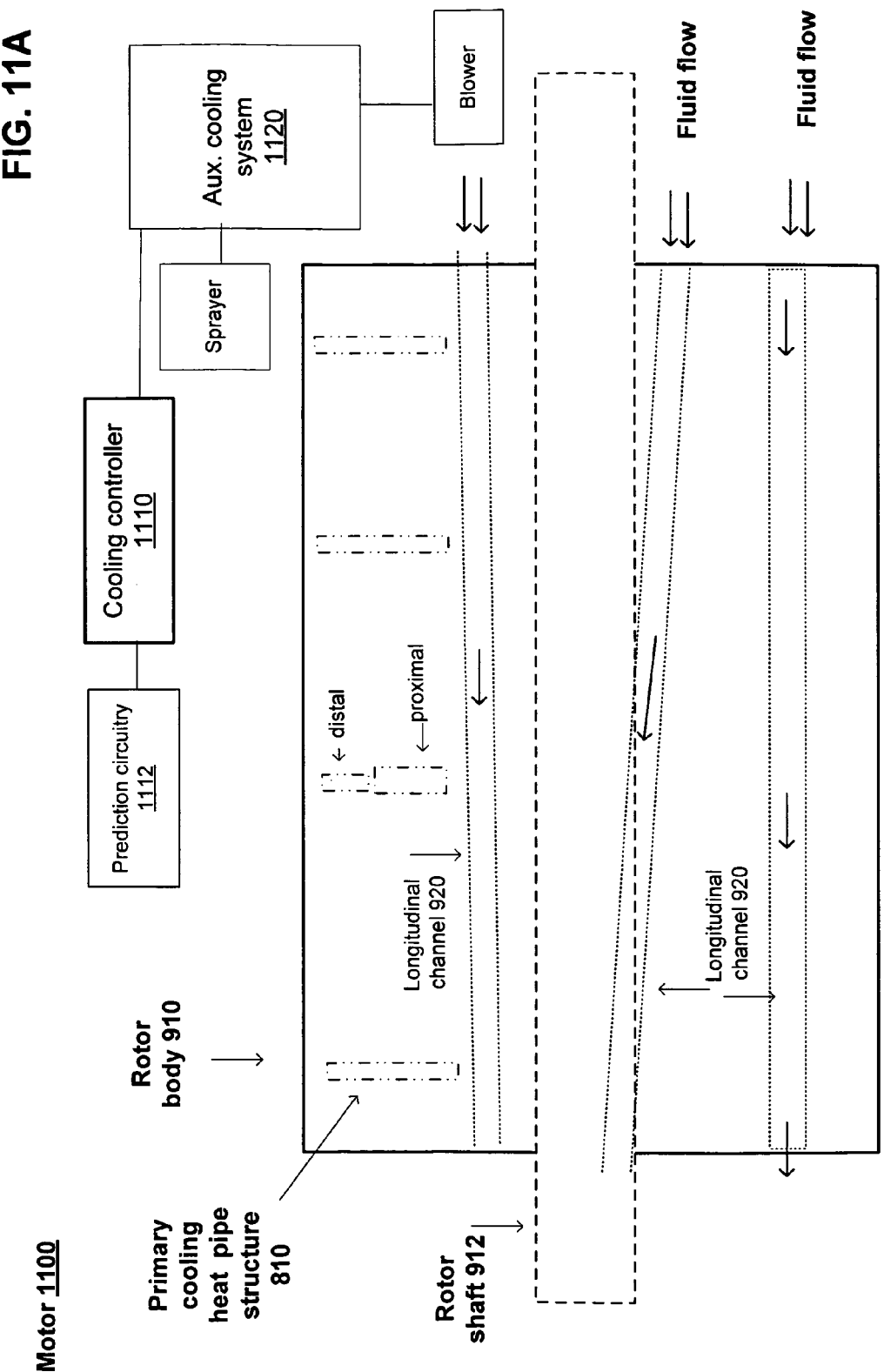

FIG. 11A shows another exemplary electrical machine 1100, which includes a rotor component configured to rotate with respect to a stator component. In addition to cooling controller 1110 and optionally prediction circuitry 1112, machine 1100 includes a primary cooling arrangement (e.g., system 700, 800, 900, 1000, etc.) and an auxiliary cooling system (e.g., cooling arrangement 1120) each configured to cool one or more portions of electrical machine 1100. The auxiliary cooling system may, for example, be one or more of a heat pipe, a thermoelectric cooler, a cooling fluid spray, a switchable thermal conductance, a fluid convection arrangement, and/or a cooling mechanism based on phase change.

Cooling controller 1110 may be configured to activate the auxiliary cooling system to cool a portion of the machine in preparation of component overheating under a machine operation scenario. The component overheating under the machine operation scenario may include temperature increases due to machine startup, increase in load, change in motor speed and/or change in the primary cooling system.

Cooling controller 1110 may be configured to time the activation of the auxiliary cooling system to cool a portion of the machine according to details of the machine operation scenario. The details of the machine operation scenario considered by cooling controller 1110 may, for example, include one or more of times corresponding to machine startup, changes in load and/or changes in a primary cooling system coupled to the machine. The details of the machine operation scenario may include a schedule of future machine operations. The schedule of future machine operations may, for example, include instructions for activating the auxiliary cooling system in advance of particular machine operations.

FIG. 11B shows an exemplary method 20 for removing or transferring heat from rotor and/or stator portions of an electrical machine having a rotor component configured to rotate with respect to a stator component and having a primary cooling arrangement. Method 20 includes deploying an auxiliary cooling system configured to cool one or more portions of the electrical machine (21), and activating the auxiliary cooling system to cool a portion of the machine in preparation of component overheating under a machine operation scenario (22). The auxiliary cooling system may, for example, be one or more of a heat pipe, a thermoelectric cooler, a cooling fluid spray, a switchable thermal conductance, a fluid convection arrangement, and/or a cooling mechanism based on phase change. The component overheating under the machine operation scenario may, for example, include temperature increases due to machine startup, increase in load, change in motor speed and/or change in a primary cooling system, etc.

Method 20 may further include deploying a cooling controller is configured to time the activation of the auxiliary cooling system to cool a portion of the machine according to details of the machine operation scenario (23). The details of the machine operation scenario include one or more of times corresponding to machine startup, changes in load and/or changes in a primary cooling system coupled to the machine. The details of the machine operation scenario may include a schedule of future machine operations. The schedule of future machine operations may, for example, include instructions for activating the auxiliary cooling system in advance of particular machine operations.

Method 20 may further include ceasing operation of the auxiliary cooling system based on time, temperature and/or amount of cooling power delivered by the auxiliary cooling system, and/or on the activation and/or performance of a primary cooling system.

The invention claimed is:

1. An electrical machine, comprising:
   a rotor component configured to rotate with respect to a stator component;
   a first cooling arrangement including a fluid sprayer;
   a temperature sensing arrangement coupled to a cooling controller, and
   wherein the temperature sensing arrangement is configured to sense transient temperature increases at one or more machine locations during machine operation, and wherein the cooling controller is configured to activate the fluid sprayer to spray cooling fluid on a portion of the machine in response to the sensed transient temperature increases and a second cooling arrangement is configured to cool machine components independent of the sensed transient temperature increases.

2. The electrical machine of claim 1, wherein the portion of machine on which the fluid sprayer sprays cooling fluid is within or internal to the stator and/or rotor component.

3. The electrical machine of claim 1, wherein the fluid sprayer is configured to spray an evaporative cooling fluid on the portion of the machine.

4. The electrical machine of claim 3, further comprising, an exhaust structure configured to vent evaporated cooling fluid.

5. The electrical machine of claim 1, further comprising, a fluid recycling structure configured to recycle the cooling fluid sprayed on the portion of the machine.

6. The electrical machine of claim 1, wherein the cooling controller is configured to activate the fluid sprayer to spray cooling fluid on a portion of the machine in response to machine operation parameters including one or more of rotation speed, acceleration, and torque.

7. The electrical machine of claim 1, wherein the cooling controller is configured to activate the fluid sprayer to spray cooling fluid on a portion of the machine in response anticipated machine operation parameters including one or more of rotation speed, acceleration, and torque.

8. The electrical machine of claim 1, wherein the fluid sprayer is coupled to a fluid supply reservoir attached to the machine.

9. An electrical machine, comprising:
- a rotor component configured to rotate with respect to a stator component;
- a first cooling arrangement including a fluid sprayer;
- a temperature sensing arrangement coupled to a cooling controller, and wherein the temperature sensing arrangement is configured to sense transient temperature increases at one or more machine locations during machine operation and wherein the cooling controller is configured to activate the fluid sprayer to spray cooling fluid on a portion of the machine in response to the sensed transient temperature increases and the portion of machine on which the fluid sprayer sprays cooling fluid corresponds to an air gap between the stator and rotor components.

10. An electrical machine, comprising:
- a rotor component configured to rotate with respect to a stator component;
- a first cooling arrangement including a fluid sprayer;
- a temperature sensing arrangement coupled to a cooling controller, and wherein the temperature sensing arrangement is configured to sense transient temperature increases at one or more machine locations during machine operation, and wherein the cooling controller is configured to activate the fluid sprayer to spray cooling fluid on a portion of the machine in response to the sensed transient temperature increases and prediction circuitry is coupled to the cooling controller, wherein the prediction circuitry is configured to predict machine component heating under a machine operation scenario and wherein the controller is configured to activate the fluid sprayer to spray cooling fluid according to the predicted heating.

11. The electrical machine of claim 10, wherein the prediction circuitry is further configured to estimate available cooling capacity under the machine operation scenario.

12. The electrical machine of claim 11, wherein the prediction circuitry configured to estimate available cooling capacity includes a sensor configured to determine an amount of available cooling fluid.

13. The electrical machine of claim 12, wherein the prediction circuitry is further configured to provide an alternate machine operation scenario in an instance where the available cooling capacity is insufficient to counteract the projected component heating under the machine operation scenario.

14. The electrical machine of claim 13, wherein the alternate machine operation scenario includes limiting machine load and/or limiting a time of machine operation.

15. An electrical machine, comprising:
- a rotor component configured to rotate with respect to a stator component;
- a first cooling arrangement including a fluid sprayer;
- a cooling controller coupled to the first cooling arrangement; and
- a sensing arrangement coupled to the cooling controller, and wherein the sensing arrangement is configured to sense electrical, magnetic, and/or mechanical machine parameters, and wherein the cooling controller is configured to activate the fluid sprayer to spray cooling fluid on a portion of the machine in response to the sensed electrical, magnetic, and/or mechanical machine parameters and a second cooling arrangement is configured to cool machine components independent of the sensed electrical and/or mechanical machine parameters.

16. The electrical machine of claim 15, wherein the sensing arrangement is configured to sense mechanical machine parameters including one or more of air gap separation, component dimension, rotation speed, acceleration, and torque.

17. The electrical machine of claim 15, wherein the sensing arrangement is configured to sense electrical and/or magnetic parameters including one or more of voltage, current, capacitance, inductance, resistance, phase, frequency permeability, magnetic susceptibility, electrical and/or magnetic field strength.

18. The electrical machine of claim 15, wherein the sensing arrangement is configured to sense electrical and/or magnetic parameters in rotor and/or stator circuitry and/or differences therein.

19. The electrical machine of claim 15, wherein the portion of machine on which the fluid sprayer sprays cooling fluid is within or internal to the stator and/or rotor component.

20. The electrical machine of claim 15, wherein the fluid sprayer is configured to spray an evaporative cooling fluid on the portion of the machine.

21. The electrical machine of claim 20, further comprising, an exhaust structure configured to vent evaporated cooling fluid.

22. The electrical machine of claim 15, further comprising, a fluid recycling structure configured to recycle the cooling fluid sprayed on the portion of the machine.

23. The electrical machine of claim 15, wherein the cooling controller is configured to activate the fluid sprayer to spray cooling fluid on a portion of the machine in response to anticipated electrical, magnetic and/or mechanical machine parameters.

24. The electrical machine of claim 15, wherein the fluid sprayer is coupled to a fluid supply reservoir attached to the machine.

25. An electrical machine, comprising:
- a rotor component configured to rotate with respect to a stator component;
- a first cooling arrangement including a fluid sprayer;
- a cooling controller coupled to the first cooling arrangement; and
- a sensing arrangement coupled to the cooling controller, and wherein the sensing arrangement is configured to sense electrical, magnetic, and/or mechanical machine parameters, and wherein the cooling controller is configured to activate the fluid sprayer to spray cooling fluid on a portion of the machine in response to the sensed electrical, magnetic, and/or mechanical machine parameters and the portion of machine on which the fluid sprayer sprays cooling fluid corresponds to an air gap between the stator and rotor components.

26. An electrical machine, comprising:
- a rotor component configured to rotate with respect to a stator component;
- a first cooling arrangement including a fluid sprayer;
- a cooling controller coupled to the first cooling arrangement; and
- a sensing arrangement coupled to the cooling controller, and wherein the sensing arrangement is configured to sense electrical, magnetic, and/or mechanical machine parameters, and wherein the cooling controller is configured to activate the fluid sprayer to spray cooling fluid on a portion of the machine in response to the sensed electrical, magnetic, and/or mechanical machine parameters and prediction circuitry is coupled to the cooling controller, wherein the prediction circuitry is configured to predict machine component heating under a machine operation scenario and wherein the controller is configured to activate the fluid sprayer to spray cooling fluid according to the predicted heating.

27. The electrical machine of claim 26, wherein the prediction circuitry is further configured to estimate available cooling capacity under the machine operation scenario.

28. The electrical machine of claim 27, wherein the prediction circuitry configured to estimate available cooling capacity includes a sensor configured to determine an amount of available cooling fluid.

29. The electrical machine of claim 28, wherein the prediction circuitry is further configured to provide an alternate machine operation scenario in an instance where the available cooling capacity is insufficient to counteract the projected component heating under the machine operation scenario.

30. The electrical machine of claim 29, wherein the alternate machine operation scenario includes limiting machine load and/or limiting the time of machine operation.

31. A method comprising:
   in an electrical machine having a rotor component configured to rotate with respect to a stator component and a first cooling arrangement including a fluid sprayer,
   sensing transient temperature increase at one or more machine locations during machine operation; and
   activating the fluid sprayer to spray cooling fluid on a portion of the machine in response to the sensed transient temperature increases; and
   predicting machine component heating under a machine operation scenario and activating the fluid sprayer to spray cooling fluid according to the predicted heating.

32. The method of claim 31, further comprising, deploying a second cooling arrangement configured to cool machine components independent of the sensed transient temperature increases.

33. The method of claim 31, wherein the fluid sprayer is configured to spray an evaporative cooling fluid on the portion of the machine.

34. The method of claim 31, further comprising, deploying an exhaust structure configured to vent evaporated cooling fluid.

35. The method of claim 31, further comprising, recycling the cooling fluid sprayed on the portion of the machine.

36. The method of claim 31, wherein predicting machine component heating includes estimating available cooling capacity under the machine operation scenario and providing an alternate machine operation scenario in an instance where the available cooling capacity is insufficient to counteract the projected component heating under the machine operation scenario.

37. The method of claim 36, wherein the alternate machine operation scenario includes limiting machine load and/or limiting the time of machine operation.

38. A method, comprising:
   in an electrical machine having a rotor component configured to rotate with respect to a stator component;
   a first cooling arrangement including a fluid sprayer;
   sensing electrical, magnetic, and/or mechanical machine parameters during machine operation;
   activating the fluid sprayer to spray cooling fluid on a portion of the machine in response to the sensed electrical, magnetic, and/or mechanical machine parameters; and
   deploying a second cooling arrangement configured to cool machine components independent of the sensed electrical and/or mechanical machine parameters.

39. The method of claim 38, wherein sensing electrical, magnetic, and/or mechanical machine parameters includes sensing one or more of air gap separation, component dimension, rotation speed, acceleration, and torque.

40. The method of claim 38, wherein sensing electrical, magnetic, and/or mechanical machine parameters includes sensing one or more of voltage, current, capacitance, inductance, resistance, phase, frequency, permeability, magnetic susceptibility, electrical and/or magnetic field strength and electrical and/or magnetic parameters in rotor and/or stator circuitry and/or differences therein.

41. The method of claim 38, further comprising, deploying a second cooling arrangement configured to cool machine components independent of the sensed electrical and/or mechanical machine parameters.

42. The method of claim 38, wherein the fluid sprayer is configured to spray an evaporative cooling fluid on the portion of the machine.

43. The method of claim 42, further comprising, deploying an exhaust structure configured to vent evaporated cooling fluid.

44. A method, comprising:
   in an electrical machine having a rotor component configured to rotate with respect to a stator component;
   a first cooling arrangement including a fluid sprayer;
   sensing electrical, magnetic, and/or mechanical machine parameters during machine operation;
   activating the fluid sprayer to spray cooling fluid on a portion of the machine in response to the sensed electrical, magnetic, and/or mechanical machine parameters; and
   predicting machine component heating under a machine operation scenario and activating the fluid sprayer to spray cooling fluid according to the predicted heating.

45. The method of claim 44, wherein predicting machine component heating includes estimating available cooling capacity under the machine operation scenario and providing an alternate machine operation scenario in an instance where the available cooling capacity is insufficient to counteract the projected component heating under the machine operation scenario.

46. The method of claim 45 wherein the alternate machine operation scenario includes limiting machine load and/or limiting the time of machine operation.

47. The method of claim 46, wherein activating the fluid sprayer to spray comprises spraying cooling fluid on a portion of the machine in response to anticipated electrical, magnetic, and/or mechanical machine parameters.

48. The method of claim 46, wherein activating the fluid sprayer comprises sourcing the cooling fluid from a fluid supply reservoir attached to the machine.

* * * * *